United States Patent
Chang et al.

(10) Patent No.: US 11,676,346 B2
(45) Date of Patent: Jun. 13, 2023

(54) AUGMENTED REALITY VEHICLE INTERFACING

(71) Applicant: Motional AD LLC, Boston, MA (US)

(72) Inventors: Hsun-Hsien Chang, Brookline, MA (US); Ayman Alalao, Cambridge, MA (US); Jesse Adam Miller, Cambridge, MA (US); Harshavardhan Ravichandran, Singapore (SG)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 17/155,079

(22) Filed: Jan. 21, 2021

(65) Prior Publication Data

US 2021/0142678 A1    May 13, 2021

Related U.S. Application Data

(62) Division of application No. 16/239,394, filed on Jan. 3, 2019, now abandoned.

(60) Provisional application No. 62/629,764, filed on Feb. 13, 2018, provisional application No. 62/613,664, filed on Jan. 4, 2018.

(51) Int. Cl.
| | | |
|---|---|---|
| G06T 19/00 | (2011.01) | |
| G01C 21/36 | (2006.01) | |
| G01C 21/34 | (2006.01) | |
| G06Q 10/02 | (2012.01) | |
| G06Q 50/30 | (2012.01) | |

(Continued)

(52) U.S. Cl.
CPC ........ *G06T 19/006* (2013.01); *G01C 21/3438* (2013.01); *G01C 21/3664* (2013.01); *G06Q 10/02* (2013.01); *G06Q 50/30* (2013.01); *G08G 1/123* (2013.01); *G08G 1/202* (2013.01)

(58) Field of Classification Search
CPC ............ G01C 21/3438; G01C 21/3664; G06Q 10/00; G06Q 10/02; G06Q 40/08; G06Q 50/30; G06T 19/006; G08G 1/123; G08G 1/202

See application file for complete search history.

(56) References Cited

U.S. PATENT DOCUMENTS

| | | | |
|---|---|---|---|
| 9,552,564 B1 * | 1/2017 | Martenis | ............ G07C 9/00571 |
| 2013/0181823 A1 | 7/2013 | Stählin et al. | |

(Continued)

FOREIGN PATENT DOCUMENTS

| | | |
|---|---|---|
| CN | 103339009 | 10/2013 |
| CN | 107450531 | 12/2017 |
| WO | WO 2017079222 | 5/2017 |

OTHER PUBLICATIONS

Ponomarev, "Augmented Reality's Future Isn't Glasses. It's the Car," Aug. 23, 2017, retrieved on Jun. 29, 2020, retrieved from URL <https://venturebeat.com/2017 /08/23/ar-will-drive-the-evolution-of-automated-cars/>, 4 pages.

(Continued)

*Primary Examiner* — Omer S Khan
(74) *Attorney, Agent, or Firm* — Fish & Richardson P.C.

(57) ABSTRACT

Among other things, an apparatus includes a processor, and storage for instructions executable by the processor to, in connection with a trip of a person in an autonomous vehicle, select a specific location at which the person will be picked up for the trip or a specific location at a destination of the trip, and present through a user interface of a device visible information that depicts the specific location.

10 Claims, 28 Drawing Sheets

(51) Int. Cl.
  *G08G 1/123*   (2006.01)
  *G08G 1/00*    (2006.01)

(56) References Cited

U.S. PATENT DOCUMENTS

| | | |
|---|---|---|
| 2015/0134180 A1 | 5/2015 | An et al. |
| 2015/0339928 A1* | 11/2015 | Ramanujam ........... G06Q 50/30 |
| | | 701/23 |
| 2016/0370194 A1 | 12/2016 | Colijn et al. |
| 2017/0045885 A1 | 2/2017 | Okumura et al. |
| 2017/0282821 A1* | 10/2017 | Zych ...................... G06Q 50/30 |
| 2018/0188731 A1 | 7/2018 | Matthiesen |
| 2018/0194194 A1* | 7/2018 | Lyubich ............... B60N 2/5628 |
| 2018/0341274 A1* | 11/2018 | Donnelly ............. G08G 1/0137 |
| 2018/0365908 A1 | 12/2018 | Liu et al. |
| 2019/0063935 A1* | 2/2019 | Badalamenti ........... G06T 11/60 |
| 2019/0065852 A1 | 2/2019 | Badalannenti |
| 2019/0206258 A1 | 7/2019 | Chan et al. |

OTHER PUBLICATIONS

SAE International, "Surface Vehicle Recommended Practice, Taxonomy and Definitions for Terms Related to Driving Automation Systems for On-Road Motor Vehicles," SAE International, Sep. 30, 2016, 30 pages.
EP Extended Search Report in European Application No. 19150365, dated Jun. 7, 2019, 8 pages.
Extended European Search Report in European Appln. No. 21210572.0, dated May 31, 2022, 9 pages.

* cited by examiner

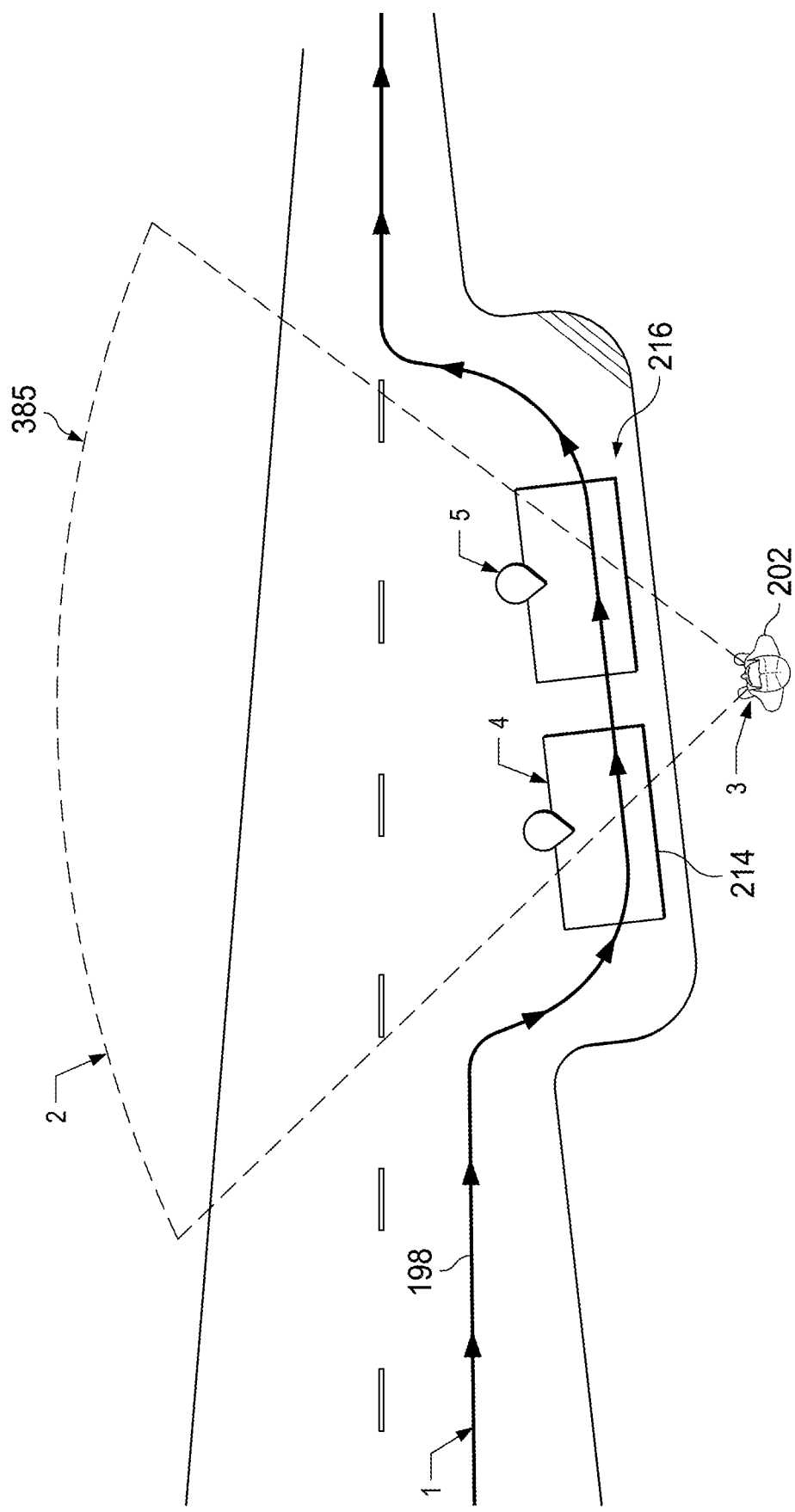

AUGMENTED REALITY VEHICLE INTERFACING

CLAIM OF PRIORITY

This application is a division of, and claims priority to, U.S. patent application Ser. No. 16/239,394, filed Jan. 3, 2019, which claims priority under 35 USC § 119(e) to U.S. Provisional Patent Application Ser. No. 62/629,764, filed on Feb. 13, 2018 and U.S. Provisional Patent Application Ser. No. 62/613,664, filed on Jan. 4, 2018, the entire contents of each which are hereby incorporated by reference.

BACKGROUND

This description relates to augmented reality vehicle interfacing.

The use of augmented reality with vehicles has become a topic of interest as suggested by the article "Augmented Reality's Future Isn't Glasses. It's the Car," https://venturebeat.com/2017/08/23/ar-will-drive-the-evolution-of-automated-cars/.

SUMMARY

In general, in an aspect, an apparatus includes a processor, and storage for instructions executable by the processor to (a) receive information about a trip of an autonomous vehicle, (b) identify a real-world scene that corresponds to the trip of the autonomous vehicle, and (c) cause a presentation on a device of augmentation elements for the trip of the autonomous vehicle, the augmentation elements to be presented in locations that enable the user of the device to view the graphical augmentation elements in the vicinity of the visible elements in the real-world scene.

Implementations may include one or a combination of two or more of the following features. The device includes an augmented reality viewing device. The device includes augmented reality glasses. The device includes a head up display. The device includes a display screen of a mobile device. The device includes a monitor located remotely from the autonomous vehicle. The user views the real-world scene live and the augmentation elements are presented on or in the vicinity of the real-world scene. The real world scene and the augmentation elements both are presented on the device. The device is inside the autonomous vehicle. The device is outside of and in the vicinity of the autonomous vehicle. The device is located at a teleoperation facility. The augmentation elements include markers that identify moving objects in the real world scene. The augmentation elements include graphical representations of moving objects in the real-world scene. The augmentation elements include a planned trajectory of the autonomous vehicle. The augmentation elements include an actual specific pick up location. The augmentation elements include a marker of a particular autonomous vehicle that is to pick up the user, among two or more autonomous vehicles visible to the user in the real-world scene.

In general, in an aspect, an apparatus includes a processor, and storage for instructions executable by the processor to (a) in connection with a trip of a person in an autonomous vehicle, select a specific location at which the person will be picked up for the trip or a specific location at a destination of the trip, and (b) present through a user interface of a device visible information that depicts the specific location.

Implementations may include one or a combination of two or more of the following features. The specific location includes a specific physical location on or near a road. The specific location includes a specific physical location identified prior to a time when the person requested the trip. The visible information includes a real image of the specific physical location. The visible information includes a real image of an autonomous vehicle presented with a real image of the specific physical location. The specific location is not identified by a street address.

In general, in an aspect, an apparatus includes a mobile device including a display, a processor, and an app or a browser to cause the processor to present on the display a depiction of an actual specific location at which a person will be picked up by an autonomous vehicle for a trip or a specific location at a destination of the trip, the actual specific location having been determined prior to a request by the person for the trip.

In general, in an aspect, an apparatus includes a processor, and storage for instructions executable by the processor to (a) receive through a user interface of a device a signal from a user with respect to a trip of the user in an autonomous vehicle, the signal indicating a feature of the autonomous vehicle that can be controlled in response to the signal from the user, and (b) determine an action to take with respect to the autonomous vehicle to respond to the signal from the user by controlling the feature of the autonomous vehicle.

Implementations may include one or a combination of two or more of the following features. The feature of the autonomous vehicle that can be controlled in response to the signal from the user includes a temperature inside the autonomous vehicle. The signal received from the user includes a temperature inside the autonomous vehicle. The feature of the autonomous vehicle that can be controlled in response to the signal from the user includes a passenger capacity of the vehicle. The signal received from the user includes a number of passengers for the trip. The feature of the autonomous vehicle that can be controlled in response to the signal from the user includes a state of an entertainment system inside the vehicle. The state of the entertainment system includes at least one of a type of entertainment content. The state of the entertainment system includes an identifier of a broadcast station. The signal received from the user includes an identification of a source or type of content for the entertainment system. The feature of the autonomous vehicle that can be controlled in response to the signal from the user includes accommodation of a child who requires a child seat. The signal received from the user includes an indication of a child to be present on the trip. The feature of the autonomous vehicle that can be controlled in response to the signal from the user includes accommodation of packages for the trip. The signal received from the user includes of information about packages for the trip. The instructions executable by the processor are to select an autonomous vehicle from among two or more available autonomous vehicles based on the signal from the user. The selection of the autonomous vehicle is based on at least one of the passenger capacity, the package capacity, or the availability of a child car seat. The processor and storage are part of a central AV system. The instructions executable by the processor are to communicate the action to the autonomous vehicle.

In general, in an aspect, an apparatus includes a mobile device including a display, a processor, and an app or a browser to cause the processor to present on the display at least one option to control a feature of an autonomous vehicle for a trip, the feature including at least one of a passenger capacity, a package capacity, availability of a child car seat, a temperature inside the vehicle, or a feature of an entertainment system.

In general, in an aspect, an apparatus includes a processor, and storage for instructions executable by the processor to (a) receive information about a real-world environment through which an autonomous vehicle is proceeding, (b) identify one or more moving objects in the real world environment, and (c) cause a user interface of a device to present to a person a scene that includes a current visible representation of the real-world environment and visible indications confirming that the moving objects have been identified.

Implementations may include one or a combination of two or more of the following features. The information received about the real-world environment includes an image from an image-capture device and the representation presented to the person includes the image. The representation presented to the person includes a schematic representation of the real-world environment. The schematic representation of the real-world environment includes a graphical representation of the road network. The representation presented to the person includes a schematic representation of the planned trajectory of the vehicle. The visible indications confirming that the moving objects have been identified include schematic arrays of graphical elements based on signals from lidar, radar, or a camera. The visible indications confirming that the moving objects have been identified include markers of the moving objects on a live video presentation of the real-world environment. The markers include graphical boxes. The executable instructions are to cause the user interface to present the scene simultaneously with a second scene, the scene including a live video of the real-world environment, the second scene including schematic elements corresponding to the real-world environment. The device includes a mobile device. The device includes a work station. The device is in the autonomous vehicle. The device is outside the autonomous vehicle. The device is at a teleoperation location. The apparatus of any of the preceding claims in which instructions executable by the processor are to categorize the identified moving objects in the real-world environment. The markers differ for different categories of the identified moving objects.

In general, in an aspect, an apparatus includes a head up display interposed between an occupant of an autonomous vehicle and a view experienced by the occupant of a real-world environment of the autonomous vehicle, a processor, and storage for instructions executable by the processor to (a) identify objects in the real world environment that are in motion, and (b) cause a presentation on the head up display of indications of objects in the real world environment that are in motion, the indications being visible to the occupant in proximity to objects in the real world environment.

Implementations may include one or a combination of two or more of the following features. The indications are graphical elements representing the moving objects. The executable instructions are to cause the presentations of the moving objects in the head up display to be coordinated with changes in the position of the autonomous vehicle. The head up display includes an effectively transparent screen on which the graphical elements representing the moving objects are displayed. The head up display is interposed between the occupant and the windshield of the vehicle. The head up display is interposed between the occupant and a window of the vehicle. The screen includes a coating on a windshield or window of the vehicle.

In general, in an aspect, an apparatus includes: a vehicle including a plurality of sensors; a processor; and a display configured by the processor to allow a user to view information with respect to the vehicle; wherein the processor receives data from the plurality of sensors about an environment of the vehicle, analyzes the data to generate the information with respect to the vehicle, and shows the information on the display, and wherein the information includes features relevant to operation of the vehicle that not present in the environment of the vehicle.

In general, in an aspect, a vehicle includes: driving components including an acceleration component, a steering component, and a deceleration component; autonomous driving capabilities to issue signals to the driving components to drive the vehicle in an at least partial autonomous driving mode; an analysis component to analyze data accumulated by sensors on the vehicle and generate information about an environment of the vehicle, and a display that shows the information about the environment of the vehicle, wherein the information includes features not present in the environment of the vehicle.

In general, in an aspect, a method includes: receiving data from one or more sensors about the surroundings of the one or more sensors; analyzing the data to identify one or more features in the surroundings of the one or more sensors, the one or more features related to operation of an autonomous vehicle (AV); and displaying, on a screen, a rendering of the surroundings of the one or more sensors, wherein the rendering includes data from at least one of the sensors, and at least one object representing one or more of the identified features.

Implementations may include one or a combination of two or more of the following features. The rendering includes at least one imaginary object related to operation of the autonomous vehicle. The imaginary object includes a rendering of a vehicle. The imaginary object includes a rendering of a vehicle located at a location chosen by a user. The imaginary object includes a marking indicating a planned trajectory of the autonomous vehicle. The one or more sensors are attached to a headset. The one or more sensors are attached to a pair of glasses. The one or more sensors are attached to a smartphone. The at least one object is a tag that identifies a class to which the identified feature belongs.

Implementations may include one or a combination of two or more of the following features. Displaying a rendering includes presenting an interactive interface. Presenting an interactive interface includes presenting a field of view or a bird's-eye of a vision sensor of the vehicle. Presenting an interactive interface includes presenting current perception information. Presenting an interactive interface includes presenting current or past or both motion planning information. Presenting an interactive interface includes presenting a system diagram of the vehicle, the system diagram including one or more hardware components, or one or more software processes, or both. The data includes one or more of the following: a map, sensor data in the vehicle or a related AV system, trajectory data in the vehicle or a related AV system, or vision data in the vehicle or a related AV system. The display is within the autonomous vehicle. The display is remote to the autonomous vehicle.

These and other aspects, features, and implementations will become apparent from the following descriptions, including the claims and can be expressed as methods, apparatus, systems, components, program products, methods of doing business, means or steps for performing a function, and in other ways.

DESCRIPTION OF THE DRAWINGS

FIGS. 4A, 5B-5E are schematic diagrams.

DETAILED DESCRIPTION

Overview

Figure 8:
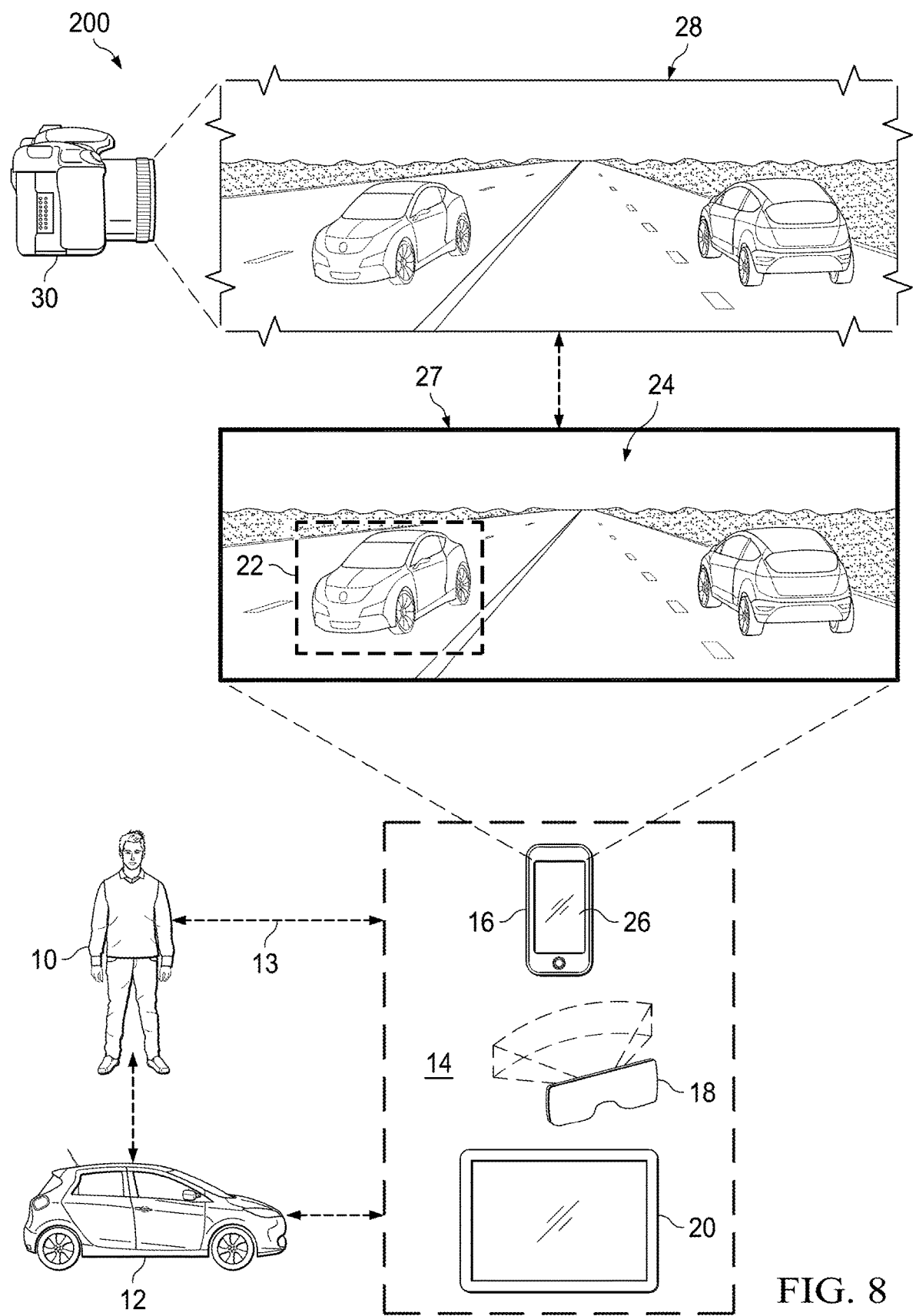

As shown in FIG. 8, the operation, hailing, occupancy, driving, and other activities of people 10 in using, viewing, and avoiding accidents with one or more vehicles 12 (such as but not limited to an autonomous vehicle) on a system 200 can be associated with augmented reality techniques 13 implemented on or by a variety of user interface devices 14 such as a mobile device 16, a head-worn interface device 18, a head up display, or an in-vehicle display 20, among others. The user interface devices may be inside or outside the vehicle. In some implementations, the augmented reality techniques include presentation of augmented reality elements 22 that are superimposed on a real-world scene 24. In some cases, the augmented reality elements 22 are superimposed on the real-world scene 24 by presentation through user interfaces 26 on displays 27 of the user interface devices. In some instances, the augmented reality elements are superimposed on the real-world scene by presentation through the user interfaces of both the augmented reality elements 22 and a view 28 of the real-world scene, which may have been captured by a camera, microphone, or other scene capture device 30, or combinations of them. The user interface devices can present the augmented reality elements (and in some cases the real-world scene) using native applications (or Web browsers) running on the user interface devices. The native applications (or Web browsers) can be capable of accepting as inputs data representing the real-world scene, generating augmented reality elements, and combining them for presentation on the displays of the user interfaces. Often, the real-world scene and the augmented reality elements are presented in real time (e.g., "live") so that they are relevant and useful to people in real-world contexts associated with vehicles.

The term "augmented reality" or "AR" is used broadly to include, for example, any direct or indirect view of a real-world scene that is supplemented, enhanced, amplified, extended, or otherwise "augmented" by presentation of any sensory element that is not physically part of the real-world scene. The sensory element can be visual such as video, graphics, or GPS data, haptic, or auditory, or a combination of two or more of those, among other kinds of elements.

Autonomous Vehicle Example

We will frequently use the example of an autonomous vehicle as the context for our descriptions. Nevertheless, at least some of the technologies that we describe here may be applicable to and useful with vehicles driven by people.

The term "autonomous vehicle" or "AV" or "driverless car" or "self-driving car" is used broadly to include, for example, any vehicle that has one or more autonomous driving capabilities.

The term "autonomous driving capability" is used broadly to include, for example, any function, feature, or facility that can participate in the driving of an AV other than by a person manipulating a steering wheel, accelerator, brake, or other physical controller of the AV.

The technologies that we describe here may be applicable to any vehicle that has one or more autonomous driving capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). Autonomous driving capabilities may attempt to control the steering or speed of the vehicles. The technologies described in this document also can be applied to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). One or more of the Level 1, 2, 3, 4 and 5 vehicle systems may automate certain vehicle operations (e.g., steering, braking, and using maps) under certain driving conditions based on processing of sensor inputs. The technologies described in this document can benefit vehicles in any of the levels, ranging from fully autonomous vehicles to human-operated vehicles.

An autonomous vehicle typically is capable of sensing its environment and navigating through that environment without human input or with reduced human input as compared to a person navigating a traditional vehicle. Autonomous vehicles use a variety of techniques to detect their surroundings, such as radar, laser light, GPS, odometry, and computer vision, among others, and to produce corresponding sensory information. Advanced control systems interpret this sensory information to identify appropriate navigation paths, as well as obstacles and relevant signage. Autonomous vehicles can reduce mobility and infrastructure costs, and increase safety resulting in a significant reduction in traffic collisions and their resulting injuries. Autonomous vehicles may facilitate a variety of business models for transportation services, especially via the sharing economy.

Figure 1:
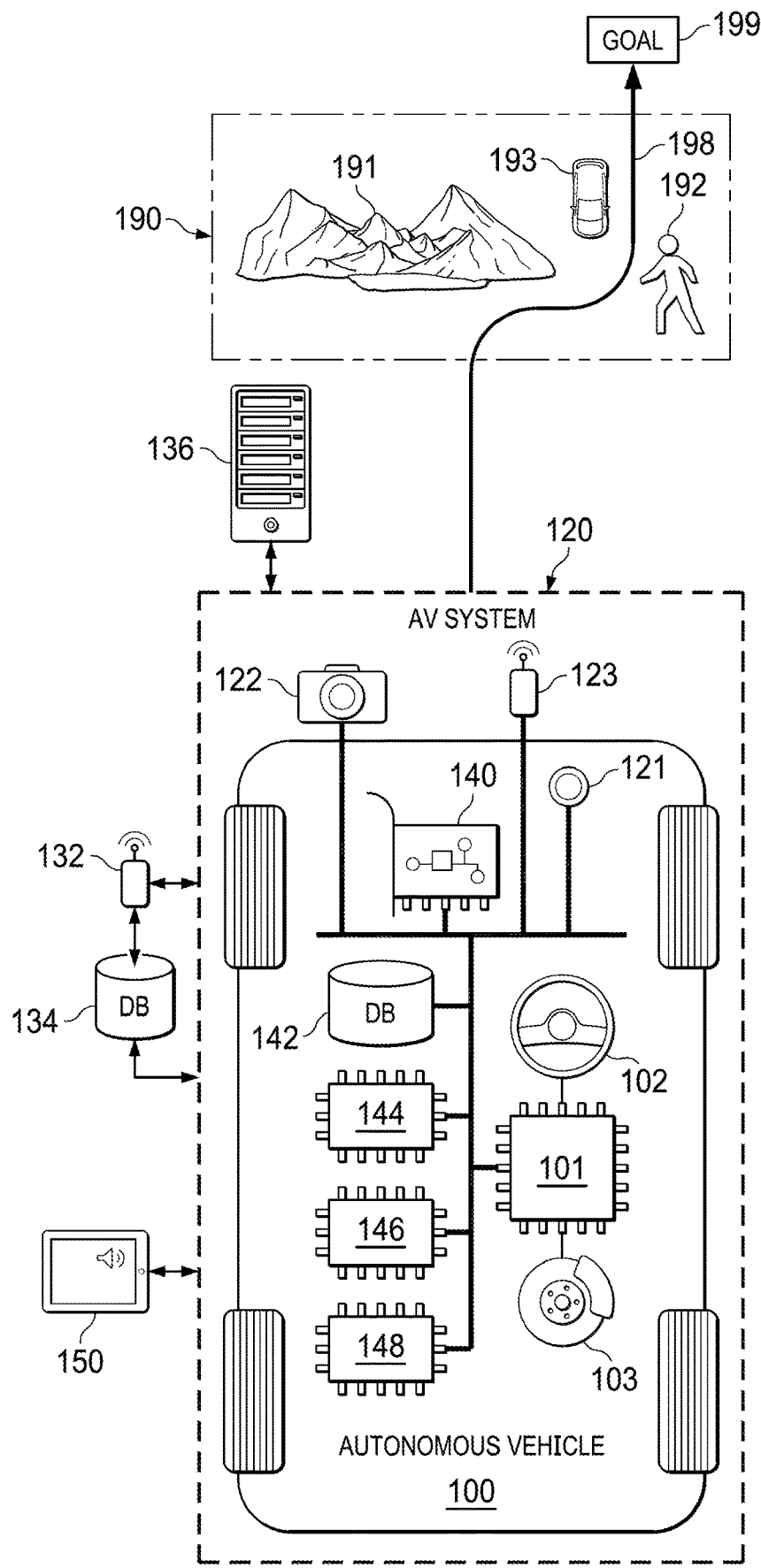
FIGS. 1, 6A, 5A, 7, 8 and 9 are block diagrams.

As shown in FIG. 1, a typical activity of an autonomous vehicle (AV) 100 is to safely and reliably drive autonomously or partially manually or both along a trajectory 198 through an environment 190 toward a destination 199 while avoiding objects (e.g., mountains 191, vehicles 193, pedestrians 192, cyclists, and other obstacles) and obeying rules of the road (e.g., rules of operation or driving preferences). The features, functions, and facilities of an AV 100 or an AV system 120 that enable the AV 100 to perform the autonomous driving often are referred to as autonomous driving capabilities.

The term "trajectory" is used broadly to include, for example, any path or route from one place to another; for instance, a path from a pickup location to a drop off location; a path toward a goal position.

The term "goal" or "goal position" is used broadly to include, for example, any place to be reached by an AV, including, for example, an interim drop-off location, a final drop-off location, or a destination, among others.

The driving of an AV 100 typically is supported by an array of technologies (e.g., hardware, software, and both stored and real-time data) that in this document together with the AV system 100 is referred to as an AV system 120. In some implementations, one or some or all of the technologies are onboard the AV 100. In some cases, one or some or all of the technologies are at another location such as at a server (e.g., in a cloud computing infrastructure).

Components of an AV system 120 can include one or more or all of the following:

1. Functional devices 101 of the AV 100 that are instrumented to receive and act on commands for driving (e.g., steering 102, acceleration, deceleration, gear selection, and braking 103) and for auxiliary functions (e.g., turning signal activation) from one or more computing processors 146 and 148.

2. Data storage unit 142 or memory 144 or both for storing machine instructions or various types of data or both.

3. One or more sensors 121 for measuring or inferring, or both, properties of the AV's state or condition, such as the AV's position, linear and angular velocity and acceleration, and heading (e.g., an orientation of the leading end of the AV). For example, such sensors can include, but are not limited to: GPS; inertial measurement units that measure both vehicle linear accelerations and angular rates; individual wheel speed sensors for measuring or estimating individual wheel slip ratios; individual wheel brake pressure or braking torque sensors; engine torque or individual wheel torque sensors; and steering wheel angle and angular rate sensors.

4. One or more sensors for sensing or measuring properties of the AV's environment. For example, such sensors can include, but are not limited to: monocular or stereo video cameras 122 in the visible light, infrared or thermal (or both) spectra; lidar 123; radar; ultrasonic sensors; time-of-flight (TOF) depth sensors; speed sensors; and temperature and rain sensors.

5. One or more communications devices 140 for communicating measured or inferred or both properties of other vehicles' states and conditions, such as positions, linear and angular velocities, linear and angular accelerations, and linear and angular headings. These devices include Vehicle-to-Vehicle (V2V) and Vehicle-to-Infrastructure (V2I) communication devices and devices for wireless communications over point-to-point or ad hoc networks or both. The communications devices 140 can communicate across the electromagnetic spectrum (including radio and optical communications) or other media (e.g., air and acoustic media).

6. One or more communication interfaces 140 (e.g., wired, wireless, WiMAX, Wi-Fi, Bluetooth, satellite, cellular, optical, near field, or radio, or combinations of them) for transmitting data from a remotely located database 134 to the AV system 120, transmitting sensor data or data related to driving performance to a remotely located database 134, or transmitting information that relates to teleoperations, or a combination of them.

7. One or more data sources for providing historical, or real-time, or predictive information, or a combination of any two or more of them about the environment 190, including, for example, maps, driving performance, traffic congestion updates or weather conditions. Such data may be stored on a data storage unit 142 or memory 144 on the AV 100, or may be transmitted to the AV 100 via a communications channel from a remote database 134 or a combination of them.

8. One or more data sources 136 for providing digital road map data from GIS databases, potentially including one or more of the following: high-precision maps of the roadway geometric properties; maps describing road network connectivity properties; maps describing roadway physical properties (such as traffic speed, traffic volume, the number of vehicular and cyclist traffic lanes, lane width, lane traffic directions, or lane marker types and locations, or combinations of them); and maps describing the spatial locations of road features such as crosswalks, traffic signs or other travel signals of various. Such data may be stored on a memory 144 on the AV 100, or transmitted to the AV 100 via a communications channel from a remotely located database server, or a combination of the two.

9. One or more data sources 136 or sensors 132 for providing historical information about driving properties (e.g., speed and acceleration profiles) of vehicles that have previously traveled along local road sections, for example, at similar times of day. Such data may be stored on a memory 144 on the AV 100, or transmitted to the AV 100 via a communications channel from a remotely located database 134, or a combination of the two.

10. One or more computing devices 146 and 148 located on the AV 100 (or remotely or both) for executing algorithms for on-line generation of control actions based on both real-time sensor data and prior information, allowing the AV system 120 to execute its autonomous driving capabilities.

11. One or more processes of processing sensor data, perceiving the environment, understanding conditions that are currently presented by and may at future times be presented by the perceived environment, performing trajectory planning, performing motion control, and making decisions based on those perceptions and understandings. A process may be implemented by integrated circuits, field-programmable gate arrays, hardware, software, or firmware, or a combination of two or more of them.

12. One or more interface devices 150 (e.g., displays, mice, track balls, keyboards, touchscreens, speakers, biometric readers, and gesture readers) coupled to the computing devices 146 and 148 for providing information and alerts to, and receiving input from, a user (e.g., an occupant or a remote user) of the AV 100. The coupling may be wireless or wired. Any two or more of the interface devices may be integrated into a single device.

Other features and components can also be integrated into the AV system 120.

Augmented Reality in Vehicle Interfacing

The technologies that we describe here have a wide variety of applications in vehicle interfacing. The applications can be inside a vehicle or outside the vehicle and can be useful to drivers, passengers, people hailing vehicles, pedestrians, and other people. Below we describe a few applications as examples.

Requesting Transportation Services

In some applications, such as ride sharing services, autonomous and other vehicles can provide transportation services to users who do not own the vehicles. In such examples, techniques are provided to enable users to request or a hail the vehicles. In some cases, the transportation services are requested or the vehicles are hailed using, for example, user interfaces presented on mobile devices on which native applications or Web browsers are running. Some aspects of such user interfaces can include augmented reality features.

Figure 2A:
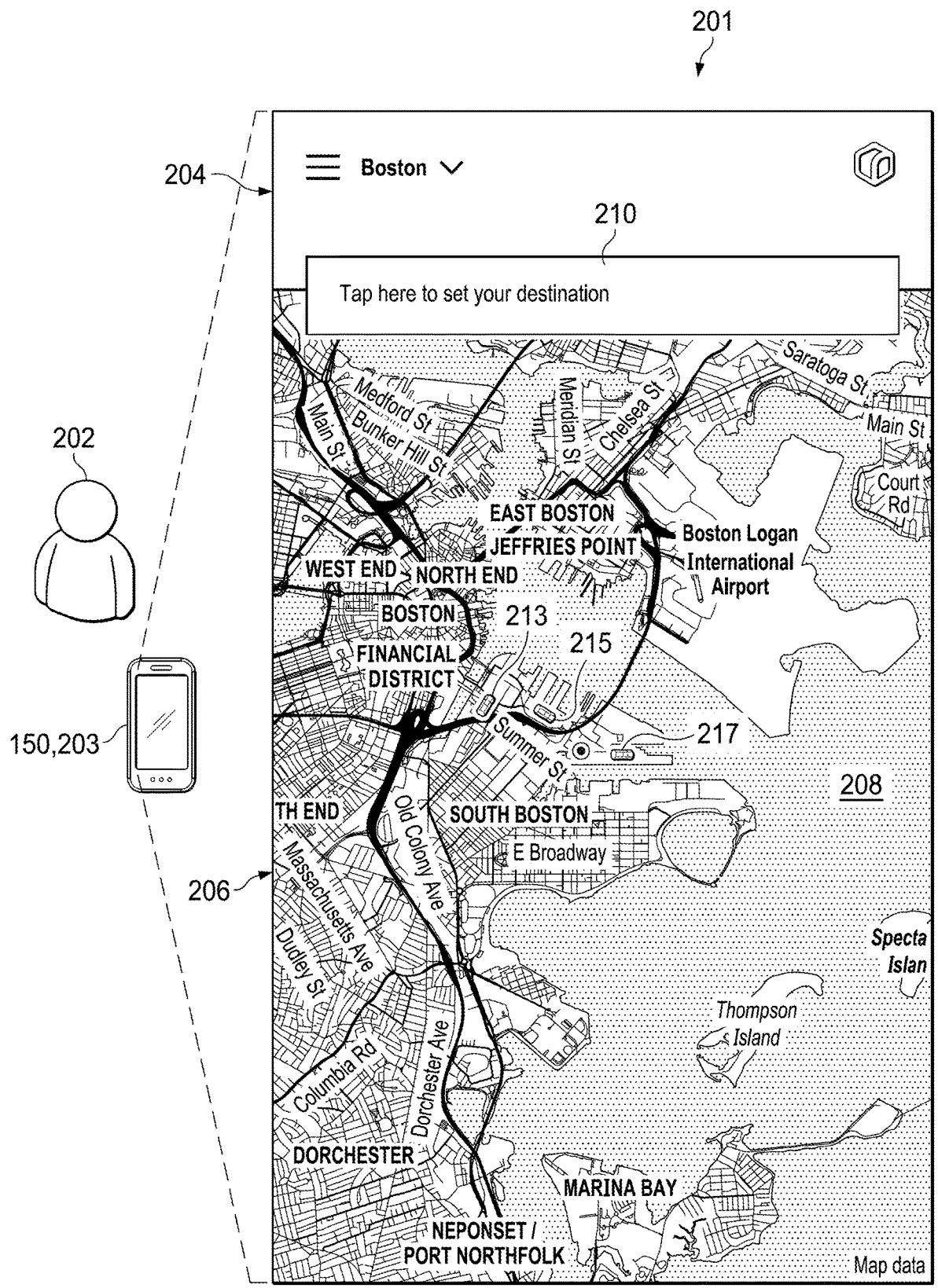
FIGS. 2A-2C, 3A-3J, 4B-4F, and 6B-6C are screen shots
Figure 2B:
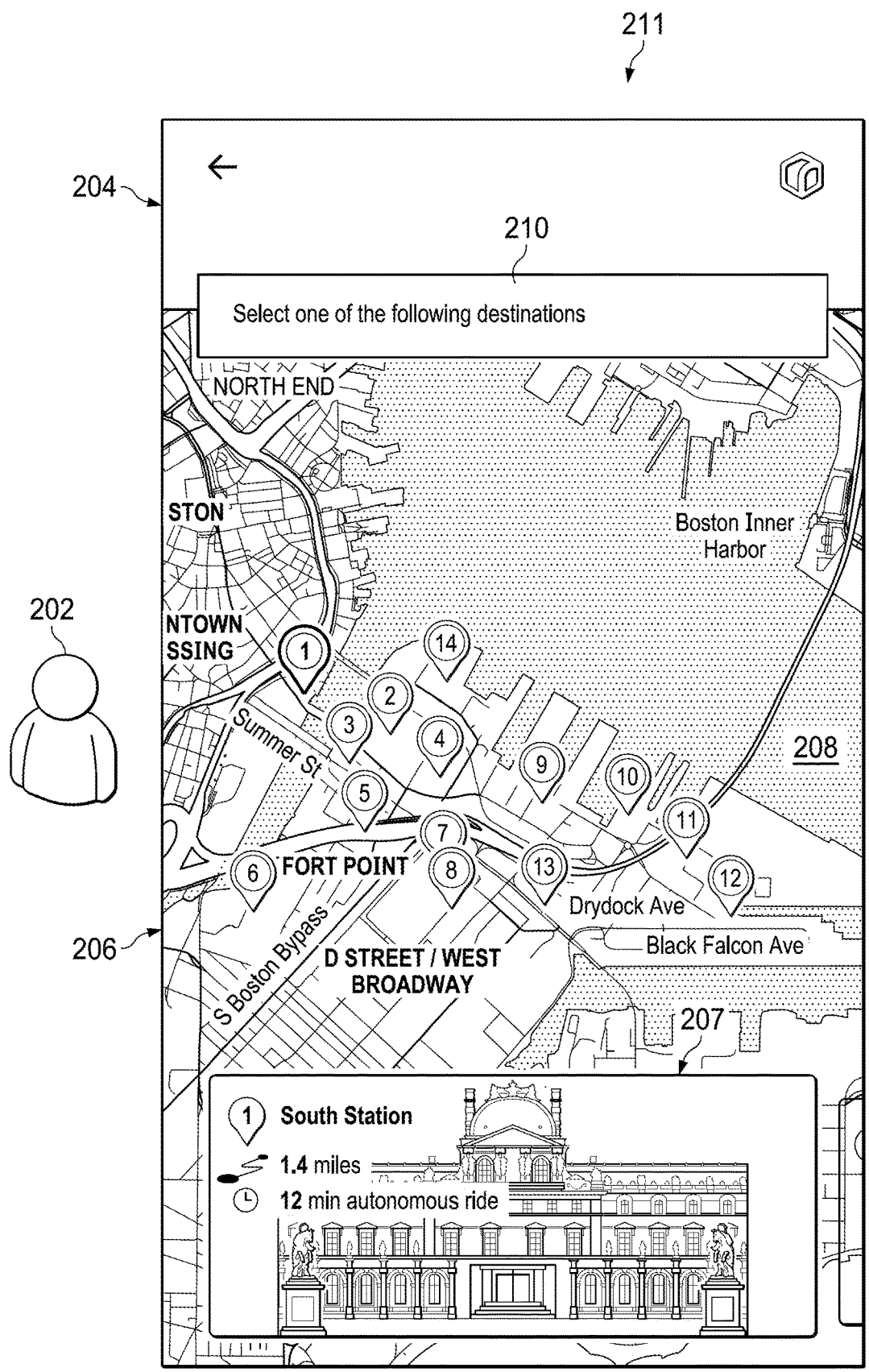
Figure 2C:
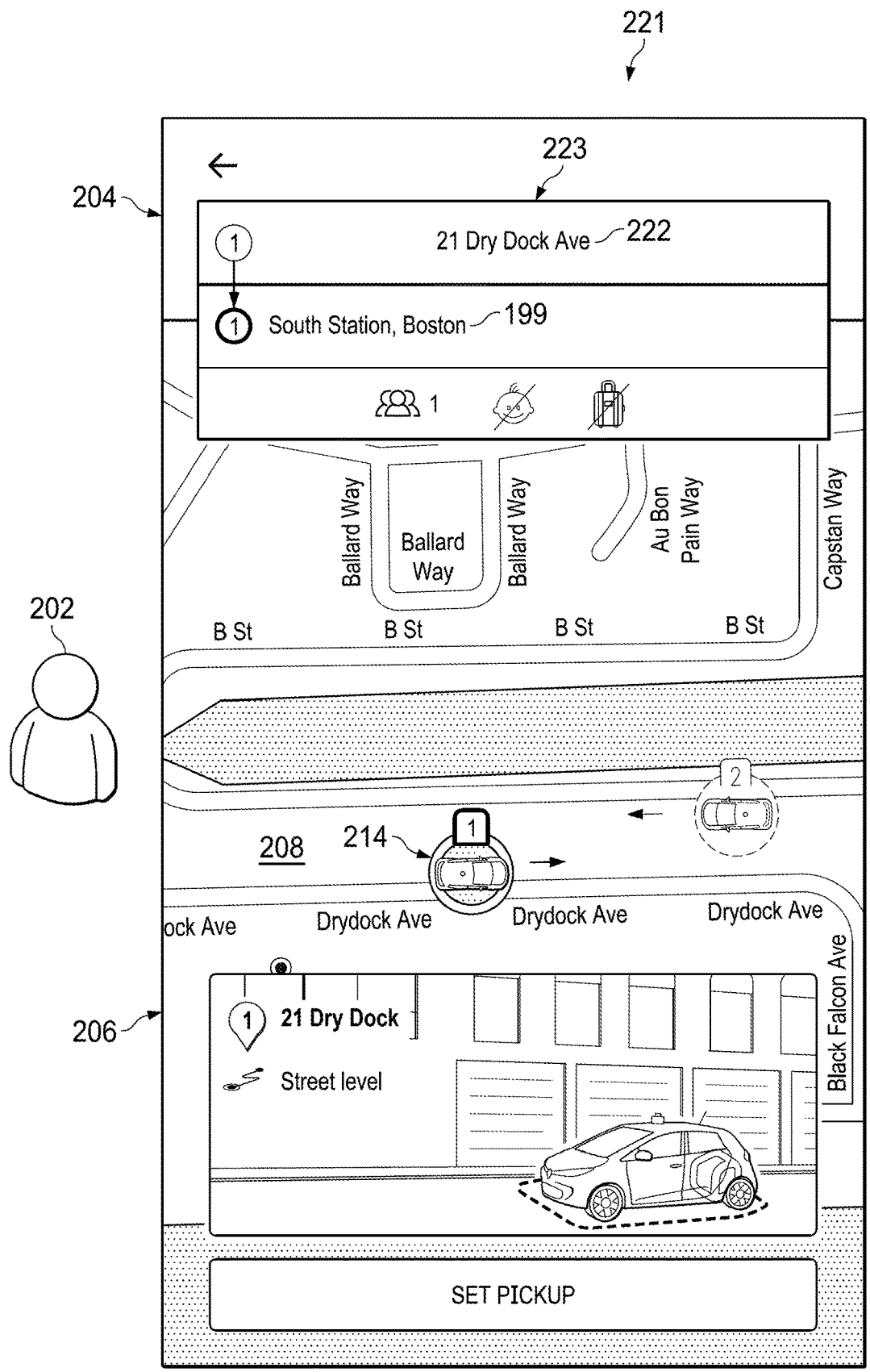

For example, referring to FIGS. 2A-2C, a user 202 can request a vehicle trip in an AV 100 that operates as part of an AV transportation services system 200 (FIG. 8). The user requests the vehicle trip using a display 203 on the mobile device or other human-computer interface device 150 that the user 202 uses to communicate with the AV system 120. For example, the user interface 201 can be part of a mobile phone application (or Web pages) that is displayed on a smartphone acting as the human-computer interface device 150, and operates as part of an AV hailing system 200.

The user 202 can interact with the AV transportation services system in a variety of ways; for example, a request for a ride can be made based on a user's gesture, voice, typing, a controller, a 2D/3D user interface, such as a 2D/3D augmented reality. In the example shown in the figures, the user 202 uses a series of user interface screens beginning with a start screen 201 on a smartphone app. Such a screen has an upper portion 204 that can include a menu access icon 205, status updates 207, and other header information. A typical screen, including start screen 201, also has a lower portion 206, which displays such information as a map 208 of the user's 202 location and augmented reality elements such as enhancement features 220 (not shown in FIGS. 2A through 2C) discussed in more detail below.

Landing Page

Referring to FIG. 2A, the illustrated screen display is an initial landing page or start screen 201 of an app or website, where the user 202 is shown a map 208 in the vicinity of his or her current location and an icon 209 showing his or her current location with high accuracy (e.g., within 1 m, within 10 cm), and optionally other relevant information including the neighboring road network and geophysical features, and icons 213, 215, 217 showing the locations of nearby AVs 100 that can be hailed. The upper portion 204 of the screen also includes information such as a prompt box 210 that in the case of start screen 201 invites the user 202 to select a destination. The user 202 can type or otherwise input a destination, or a suggestion screen 211 (FIG. 2B) can display icons to 19 that suggest nearby destinations while the prompt box 210 shows a request that the user choose one of the displayed potential destinations. The suggestion screen 211 can also include additional information 207 in the lower portion 206 of the screen, in this case information about one of the illustrated selectable destinations. In FIG. 2C, a destination 199 has been selected, its address 222 is shown, and a pickup location of one of the available vehicles is highlighted 214. FIG. 2C also includes a button 223 that the user can invoke to set a pickup location and a view of a currently highlighted pickup location showing its address and other information. Computing processors (e.g., computing processors 146 and 148) can execute instructions to select and show address 222, including instructions stored in memory 144.

Pickup Location and Trip Details Pages

Referring to FIGS. 3A-3J, the user 202 can specify further details concerning his or her pickup location 214 and details about the upcoming trip to the destination 199. A pickup screen 231 allows the user 202 to choose his or her pickup location using a second prompt box 212. The user's 202 current location 237 is shown on the map 208 on pickup screen 231, which is localized to the more immediate vicinity of the user at his or her current location than on start screen 201. The map 208 displays possible alternate pickup locations 214, 216 (labeled by numbers 1 and 2) where the AV 100 can stop near the user's current location 237 for him or her to enter the stopped AV 100 and proceed to the destination 199.

The two possible alternate pickup locations 214, 216 displayed on the map 208 are chosen by the AV transportation services system 200 using and combining information from various sources such data sources 136 and sensors 121. The AV transportation services system 200 analyzes the information, in conjunction with the user's 202 current location (his or her general pickup location 222), to determine potential pickup locations 214, 216 that conform to safety rules and road restrictions and user preferences, among other things. As shown, the potential pickup locations 214, 216 are specific coordinates at which the AV 100 will stop so that the user 202 may enter. In some instances, the AV transportation services system 200 may include predetermined pickup points in its data storage unit 142 or memory 144 that are within an acceptable range or walk distance to the user's location (e.g., within 2 minutes of walking, or within 250 m). These predetermined pickup points may be parking spots or curb spots that are known to be safe locations at which the AV 100 may stop while waiting for the user to enter.

In pickup screen 231 two potential pickup locations 214, 216 are shown, although just one, or more than two potential pickup locations are also possible. In pickup screen 231, a first potential pickup location 214 is highlighted for the vehicle's approach from left of the user's current location and a second potential pickup location 216 is highlighted for if the vehicle were to approach from right to the user's current location. Two locations are illustrated, but one location, or more than two locations are also possible.

The pickup screen 231 has additional information 207 in the lower portion 206 of screen. The additional information 207 displays elements (for example, augmented reality elements) that are not actually present in the real world in the vicinity of the user's current location, e.g., augmented reality (AR). In this example, the additional information 207 shows a camera view 218 of the user's general current location. In some instances, the view is taken from the camera of the smartphone held by the user, or alternatively the view can be a saved standard view (e.g., a street view from a service such as Google maps). In the camera view 218, the first potential pickup location 214 is displayed with an enhancement feature 220, e.g., an object that does not exist in the user's real world environment but which is overlaid on the camera view 218 so as to appear to belong in the real world as seen in the camera view. In this instance, the enhancement feature 220 is an image of an AV 100 positioned in the first potential pickup location 214. The user is able to evaluate the relationship of the augmented reality element (the AV) relative to the potential pickup location to determine if the potential pickup location 214 displayed is desired (e.g., near an overhang if it is raining, or free from obstacles or obstructions temporarily in the potential pickup location 214). The user 202 selects the desired pickup location, here the first potential pickup location 214.

The AV hailing system 200 may comprise multiple processes, realized by integrated circuits, field-programmable gate arrays, hardware, software, or firmware, or a combination of two or more of them. Processing and analyzing the signals and data may be realized by a processor, or a computing resource of the processor. The processor can communicate with the user through an interface and display to display screens such as pickup screen 231. The computing device can be implemented in a number of different forms, for example, it can be implemented as part of smartphone 682.

Figure 3A:
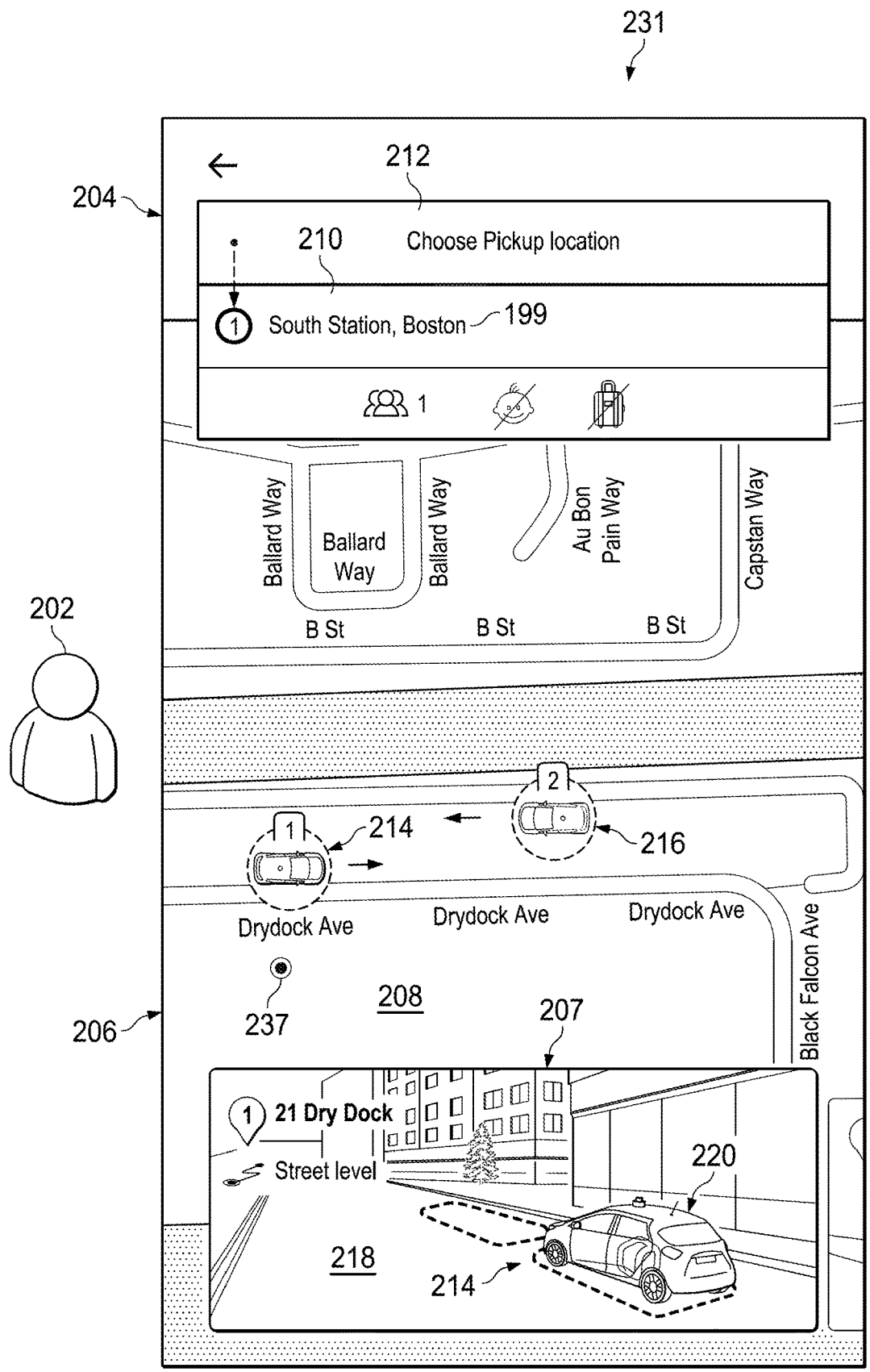
Figure 3B:
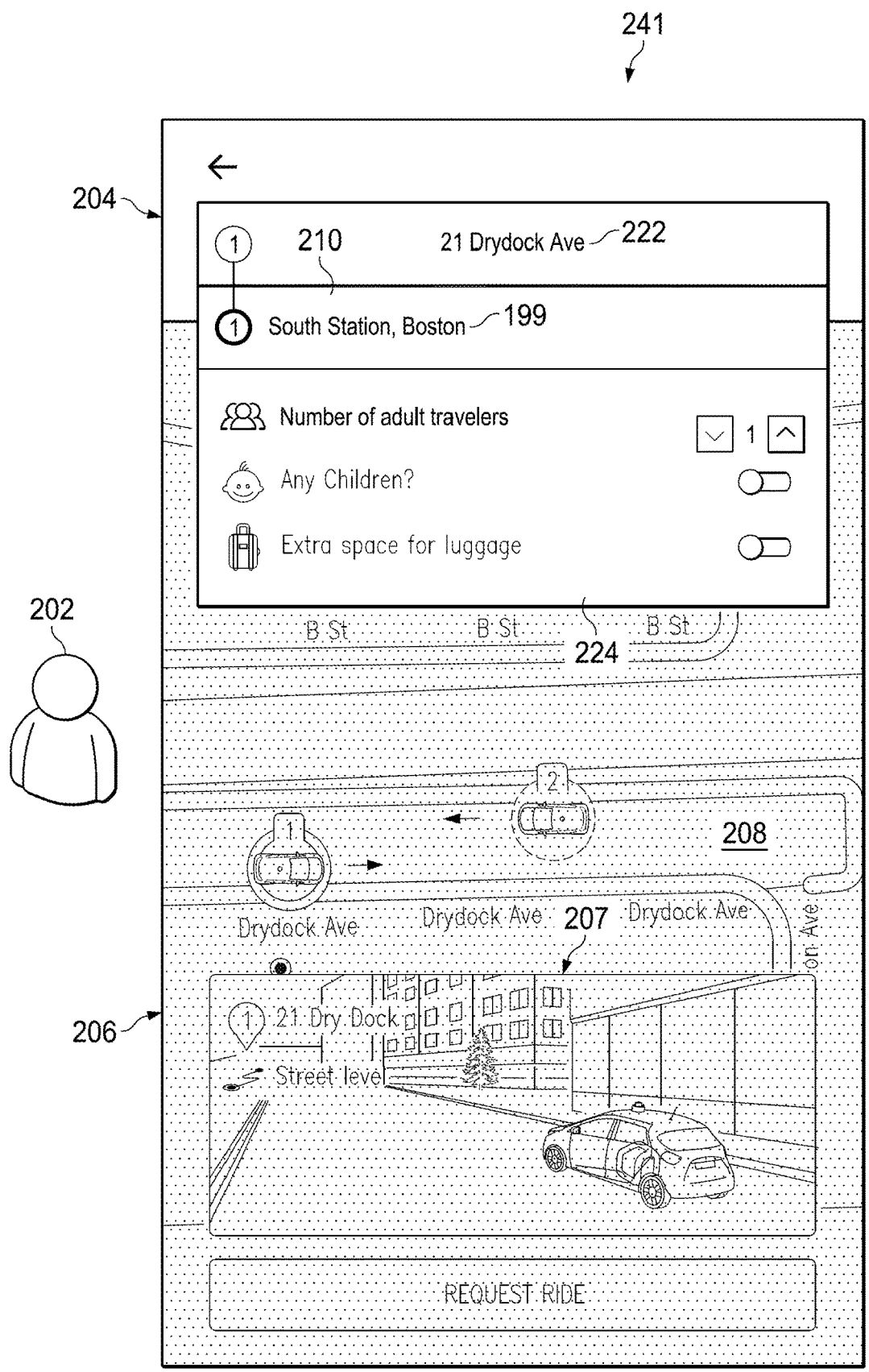

Referring to FIG. 3B, the user 202 can continue to specify details concerning his or her pickup location and details about the trip to the destination 199 in trip screen 241. The user 202 has selected a general pickup location 222, e.g., an address or a cross street, or a point on a map as was shown in FIG. 2B for selection of the destination. The general pickup location 222 appears in the second prompt box 212. The trip screen 241 includes a user details prompt 224 in which the user 202 tells the AV transportation services system 200 details about the user, e.g., the number of adult travelers, if any children will be on the trip, and if luggage will be on the trip. The information given to the AV transportation services system 200 by the user details prompt 224 allows the AV transportation services system 200 to choose an appropriate vehicle, e.g., a nearby vehicle that has the space requirements matching those input by the user at the user details prompt 224.

Figure 3C:
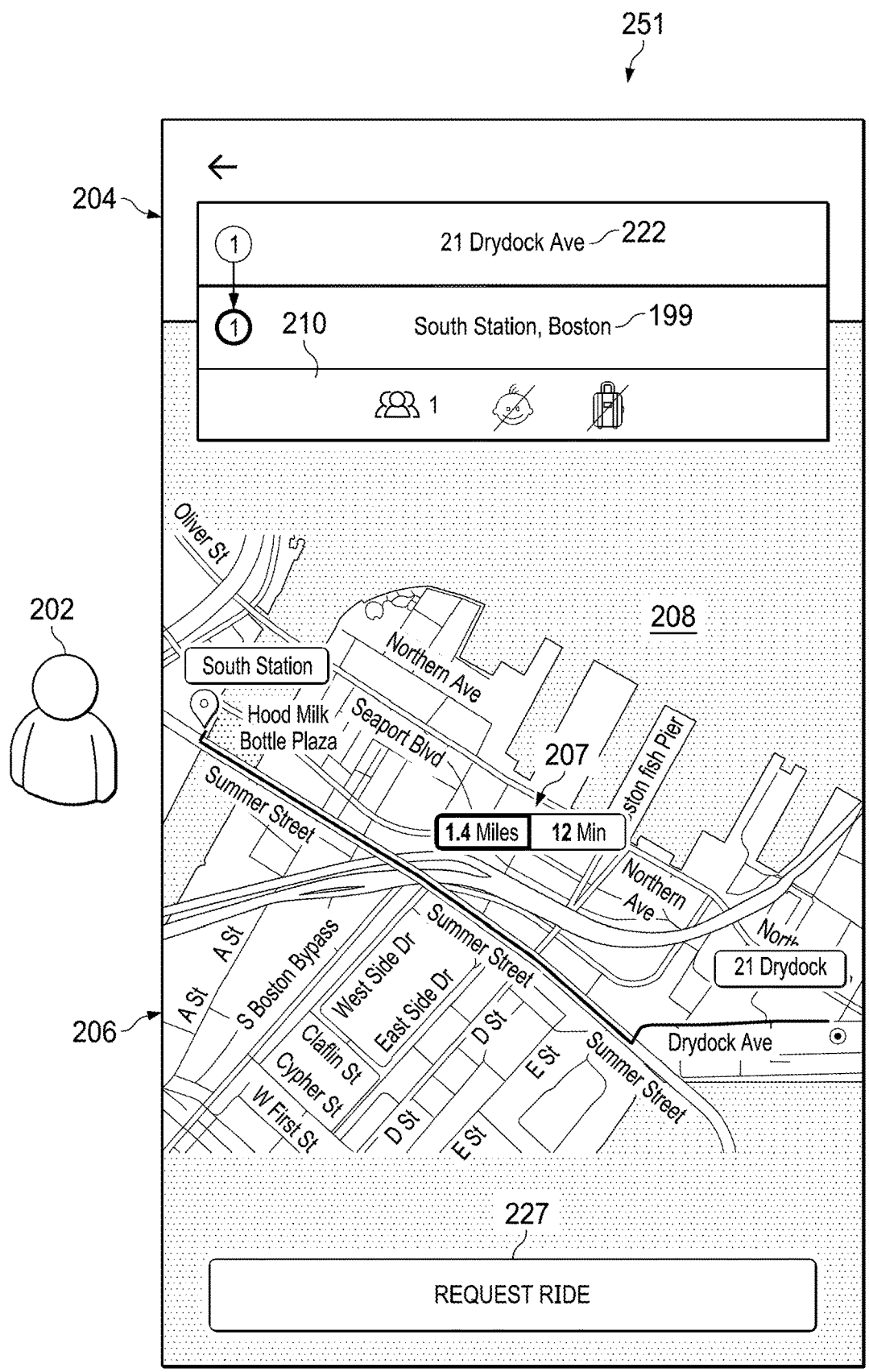
Figure 3D:
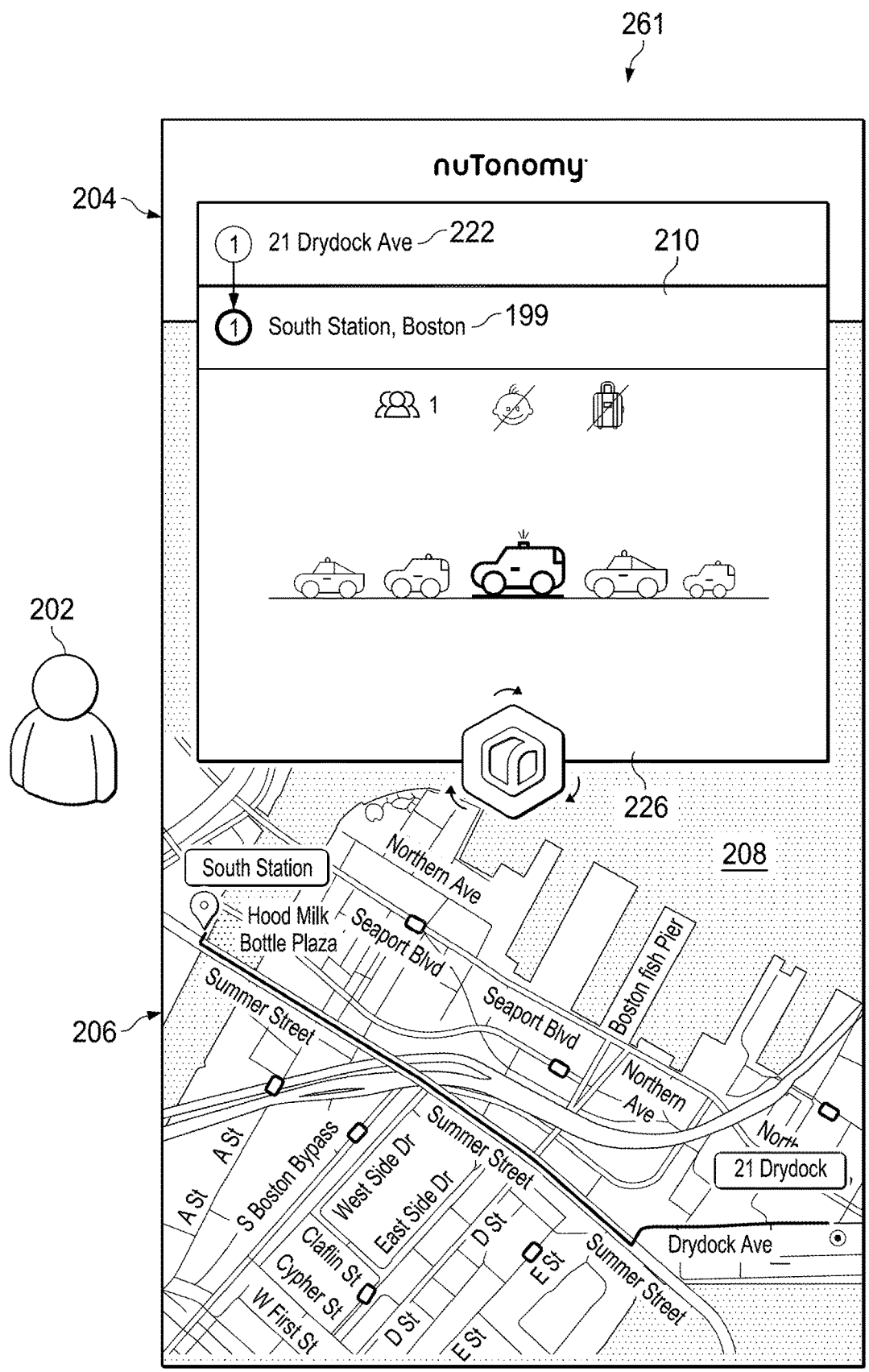
Figure 3E:
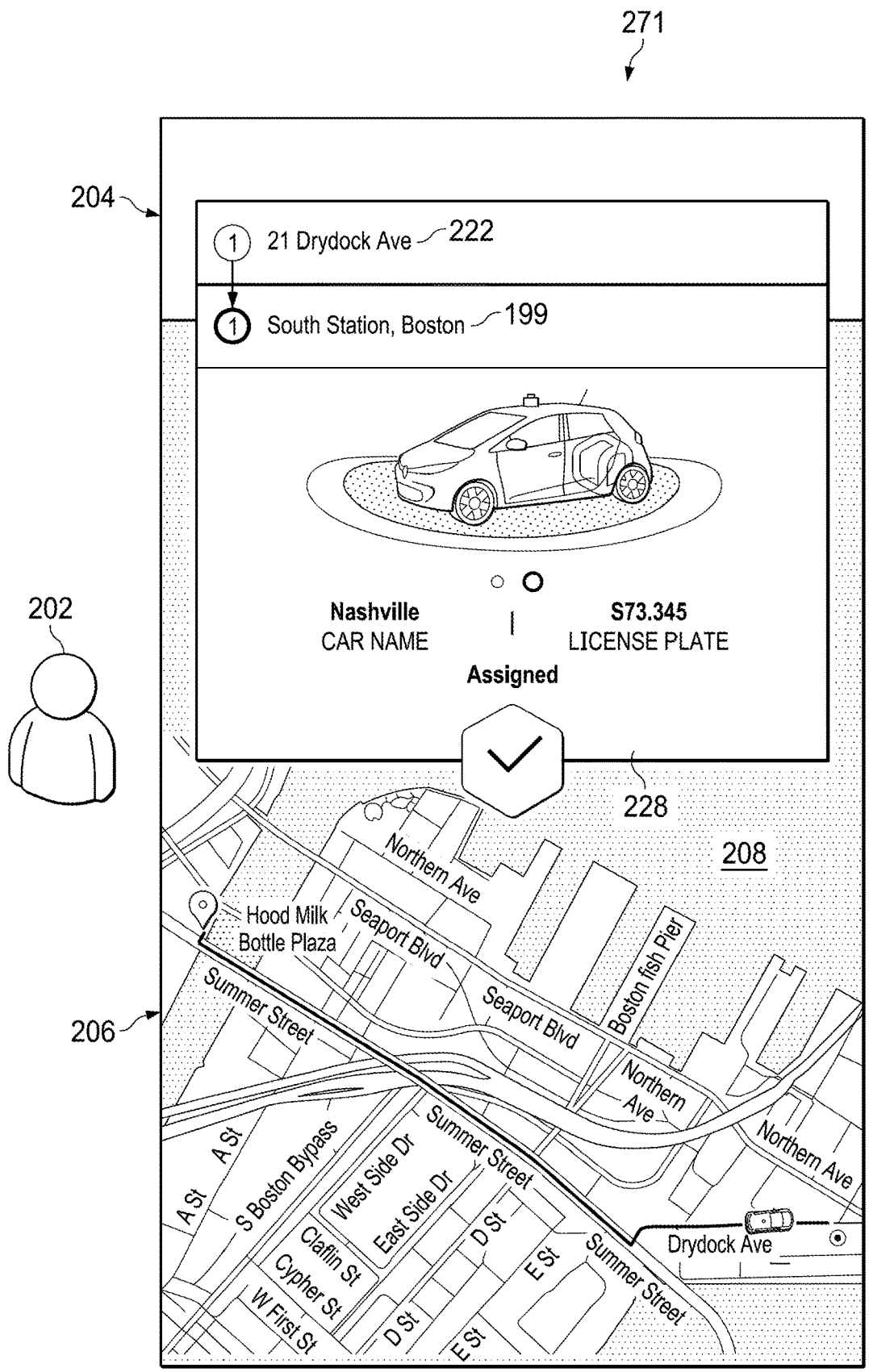
Figure 9:
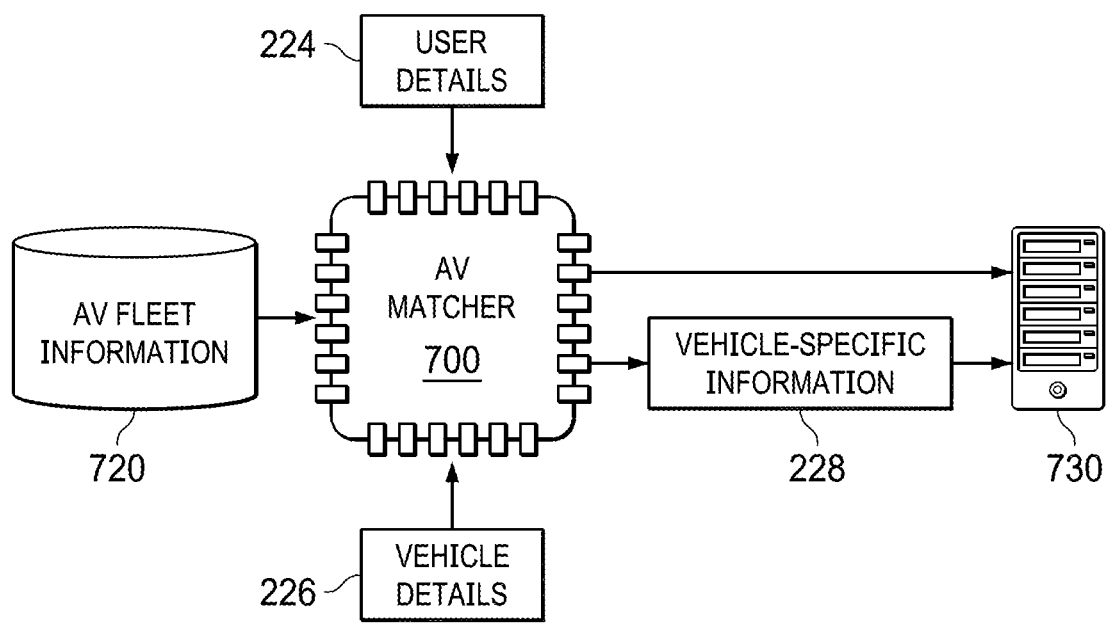

The upcoming trip display screen 251 in FIG. 3C shows the user 202 the planned route from the general pickup location 222 to the destination 199 on the map 208. Additional information 207 includes an estimated distance and time for the trip. If the user agrees with the planned route, he or she presses the "request ride" button 227. The AV transportation services system 200 then matches the request (e.g., identifies which if any vehicles are in the user's vicinity, if they match the criteria included in the user details prompt 224 and the requested type of vehicle from the vehicle details prompt 226). Referring to FIG. 3D, at vehicle selection screen 261, the user 202 can select the type of vehicle desired for the upcoming trip in vehicle details prompt 226. In some instances, the user 202 will either not be shown or be unable to select certain types of vehicles, for example if certain types of vehicles are not available, or if a certain type of vehicle does not match the information entered at the user details prompt 224 by not having the requisite room for travelers or luggage, or not having a car seat available for child travel Referring as well to FIG. 9, an AV hailing system 200 may include an AV matcher 700 (e.g., an optimization algorithm) to determine which AV (if any) matches the request of the user included in the user details prompt 224 and vehicle details prompt 226 with AV fleet information 720 (e.g., whether each vehicle is in use, current trajectories, data from sensors, or combinations of them) to determine which AV in the fleet of AVs is suitable for the user 202. The AV transportation services system 200 identifies the most suitable specific vehicle and displays vehicle-specific information 228 to the user (FIG. 3E) on selected vehicle screen 271. The vehicle-specific information 228 can include a picture of the specific vehicle, the license plate of the specific vehicle, and the name of the specific vehicle. The vehicle-specific information 228 may be visual or aural, or both. The vehicle-specific information 228 also may be transmitted to a remote recipient or computing device 730, such as a remote operator, or another autonomous system.

Figure 3F:
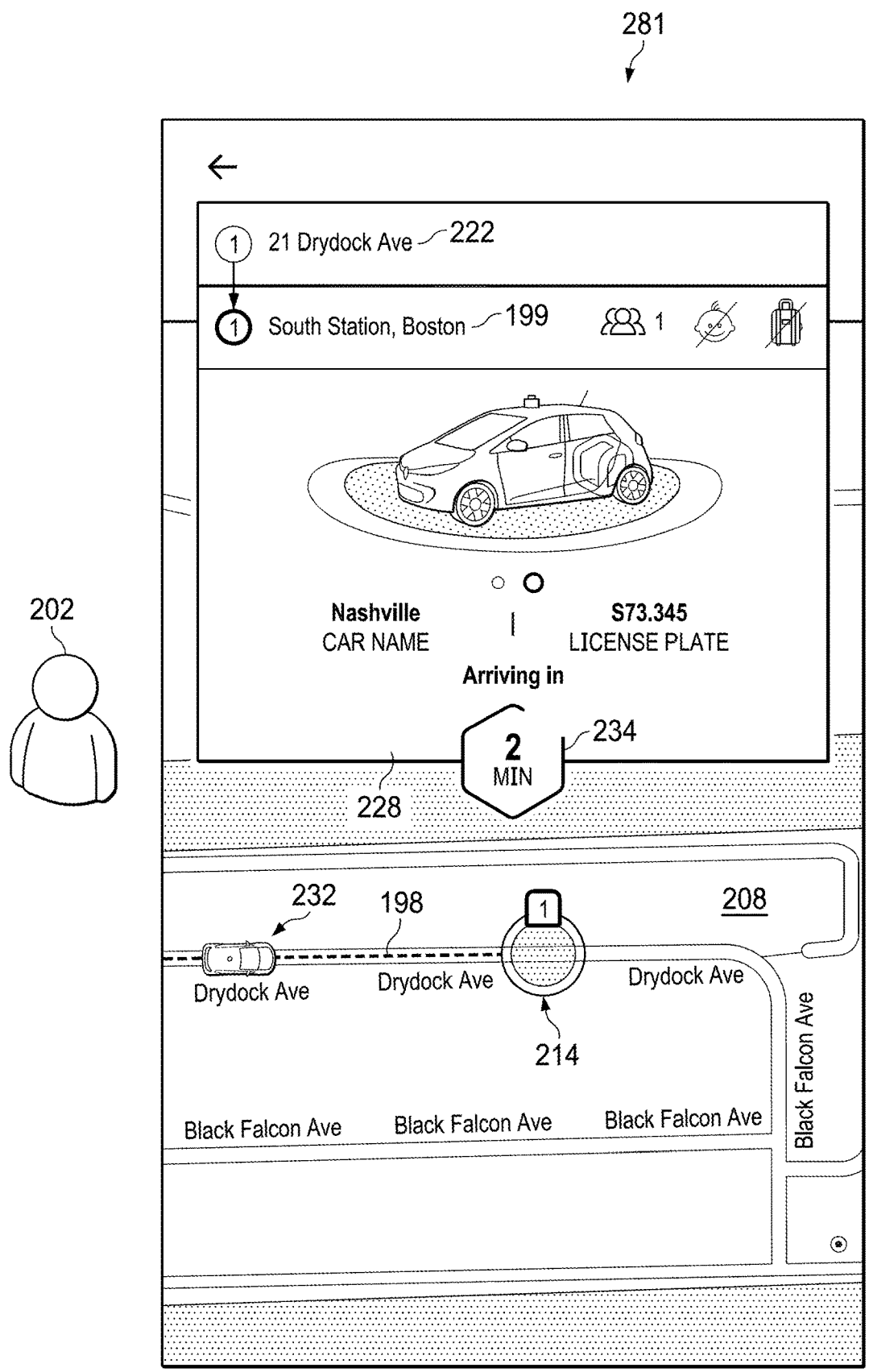
Figure 3G:
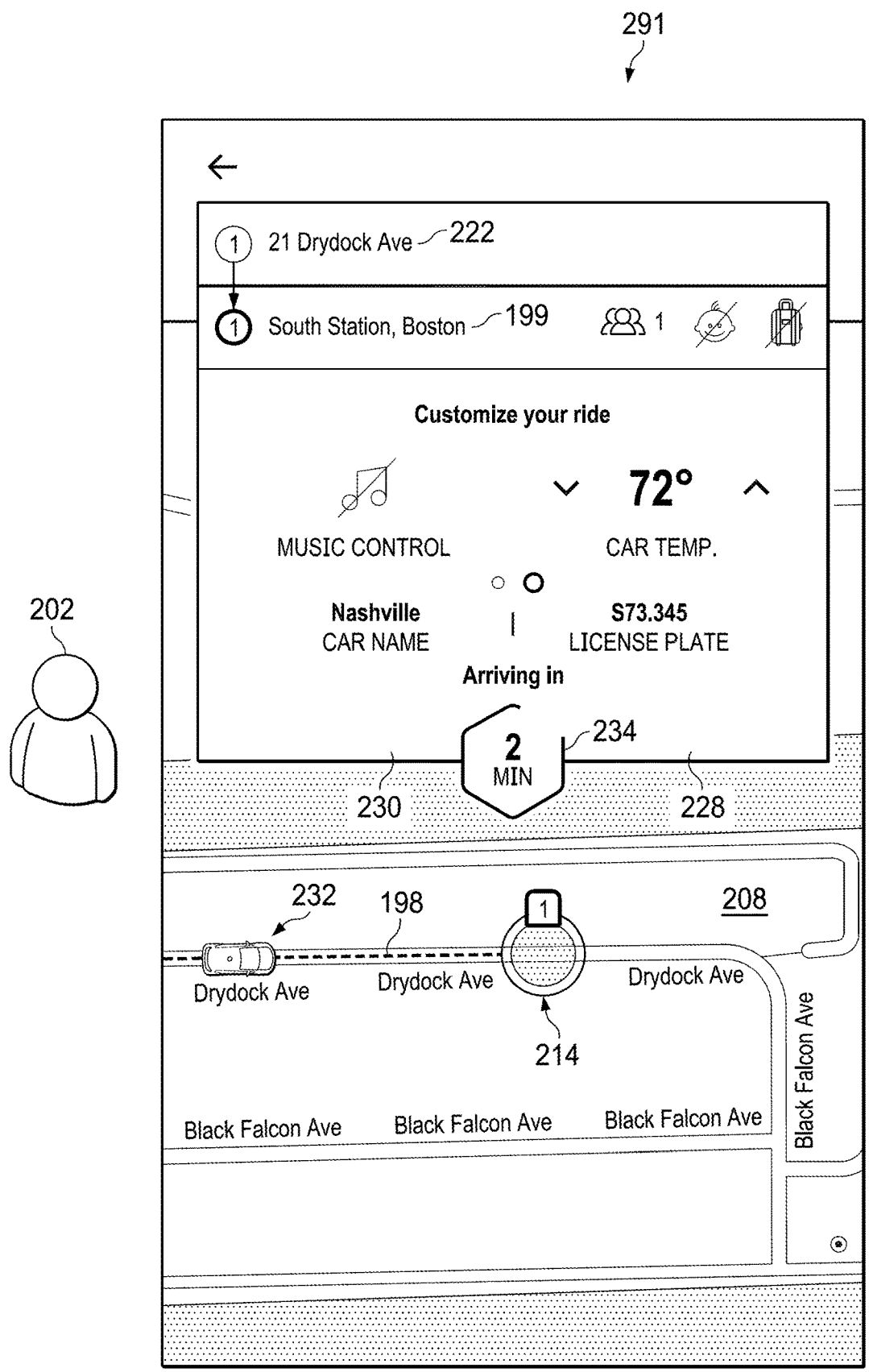

As shown in FIGS. 3F and 3G of screens 281 and 291, the map 208 can show details of the AV vehicle's 100 approach, such as its current position 232, and the current trajectory 198 on the way to the selected pickup location 214. The screens can show arrival information 234, such as the time remaining until the vehicle arrives at the pickup location 214.

In FIG. 3G, the user 202 can continue to specify details concerning the trip to the destination 199 at vehicle customization screen 281. A vehicle-specific prompt 230 allows the user to customize his or her ride, including selecting music (e.g., a radio station or music service if one is available in the selected vehicle) or the temperature of the vehicle. The vehicle-specific prompt 230 will show differing selections and information for different given vehicles and their features (e.g., control of seat warmer(s), windows being up or down, position of the seats forward or backwards, etc.).

Figure 3H:
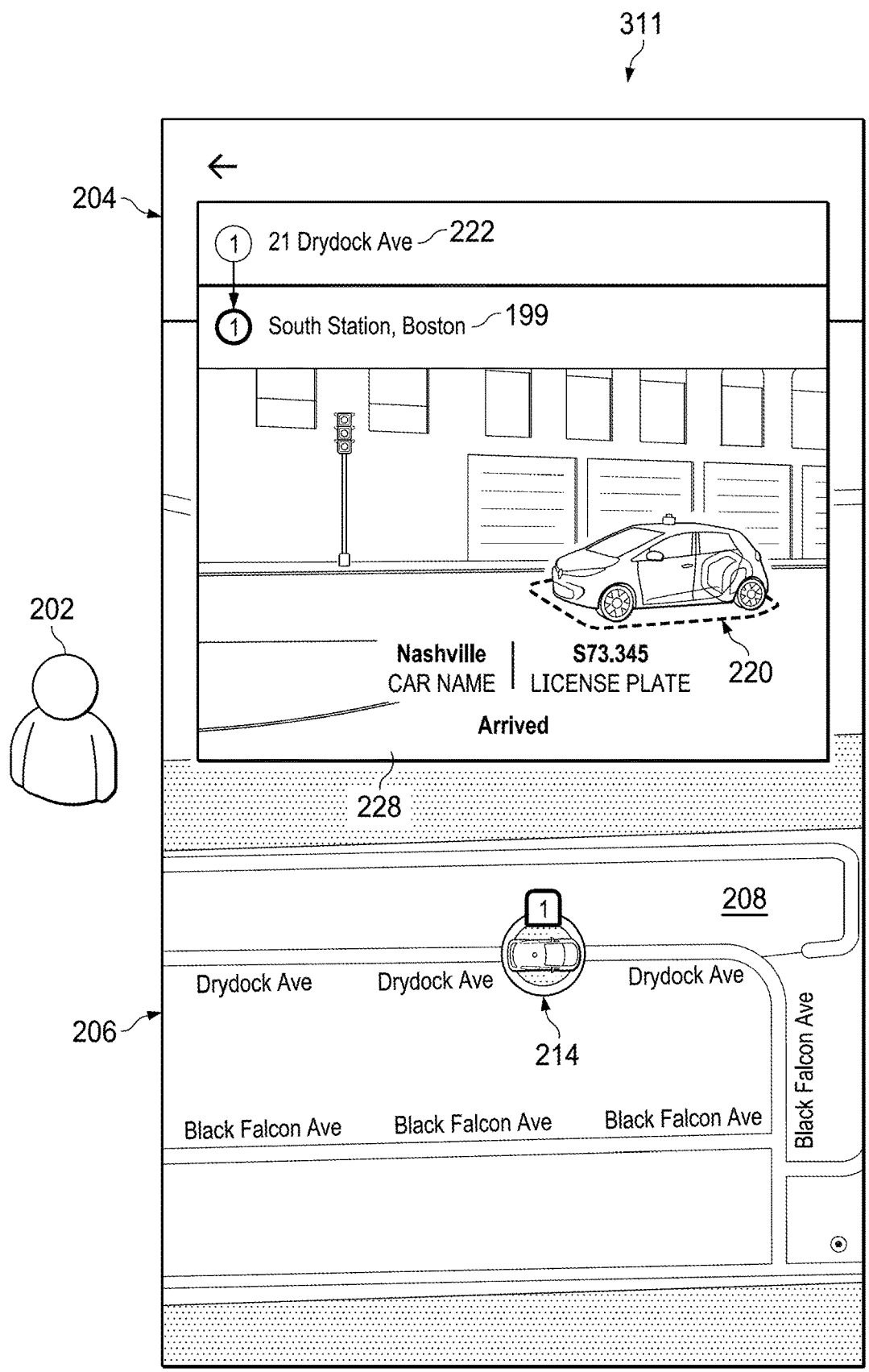

In FIG. 3H, the AV vehicle 100 has arrived and is positioned at the pickup location 214. An enhancement feature 220 shows the car in the chosen pickup spot 214, which now matches the actual view as seen by the user, thus arrival screen 311 has an enhancement feature 220 that should correspond with reality. The screens 281, 291 can also instruct the rider as to how to reach the pickup location 214, and the arrival screen 311 tells the user when the AV vehicle 100 has arrived (FIG. 3H).

Figure 3I:
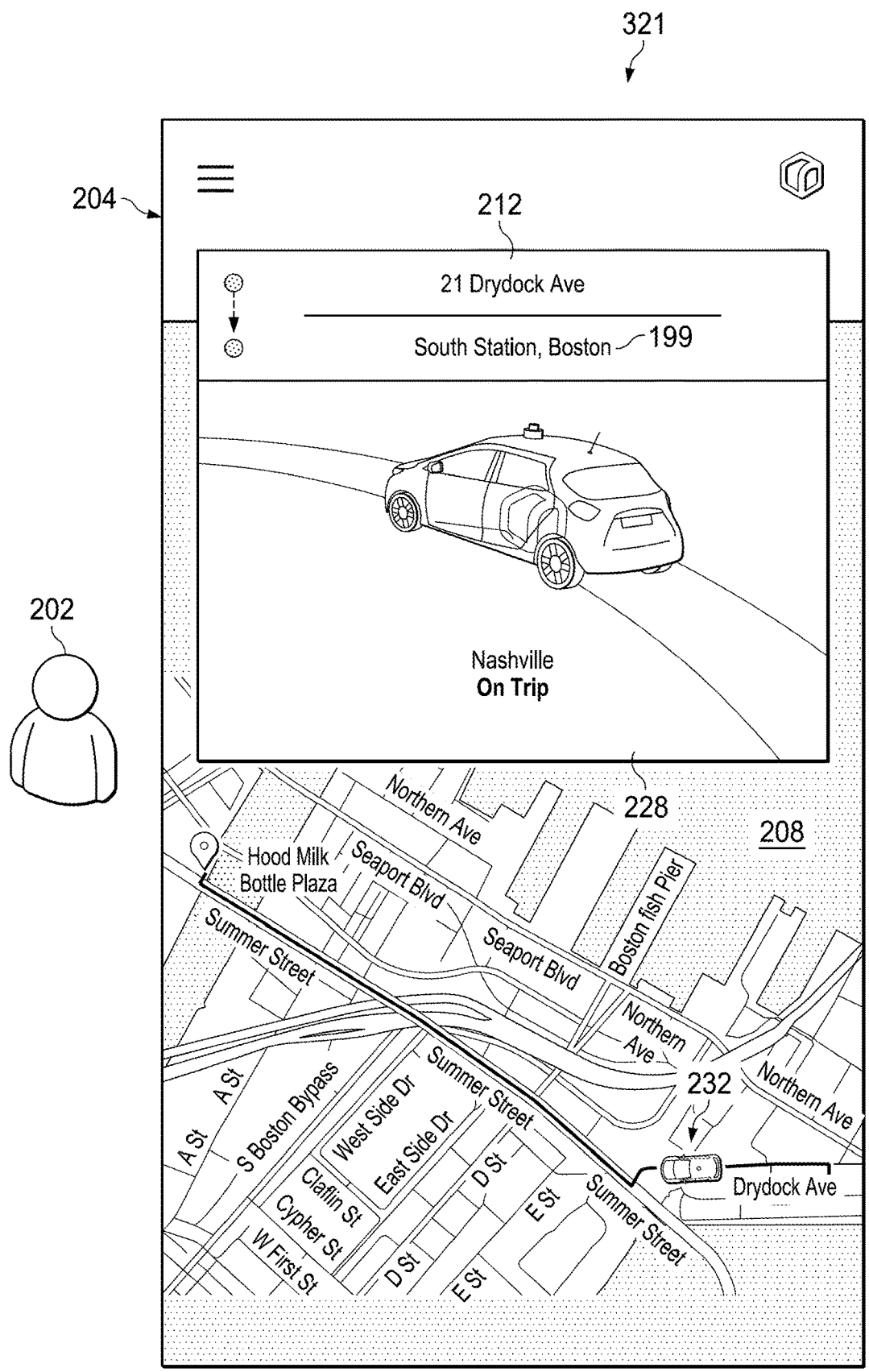

Referring to FIG. 3I, a trip screen 321 is displayed on interface device 150 while the user 202 is inside the vehicle and on the way to the destination 199. The trip screen 321 shows the current position 232 of the AV 100 on the map 208. During the trip, the user 202 can interact with the human-computer interface on the interface device 150 that the user has been using, e.g., a smartphone.

Figure 3J:
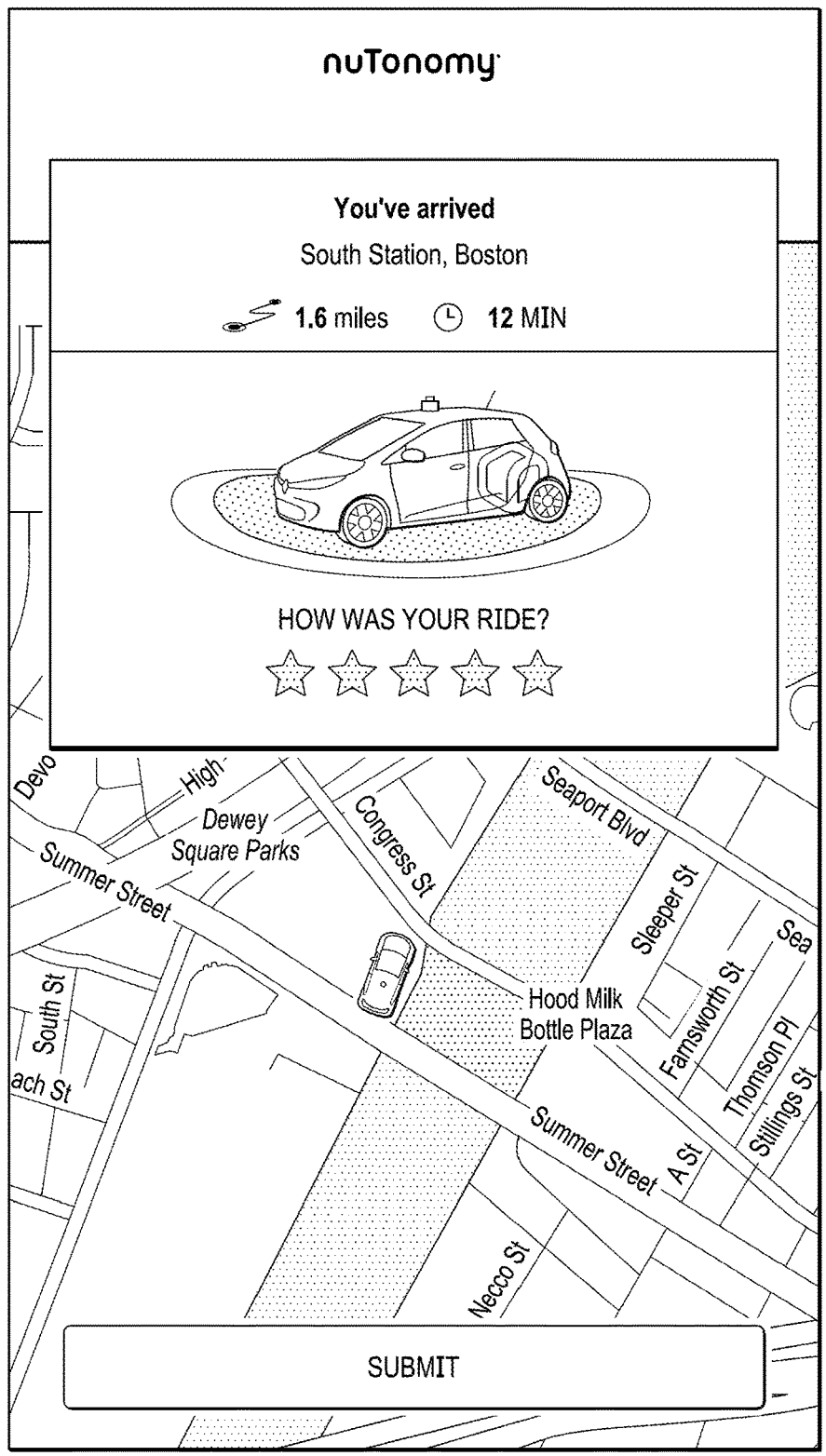

In FIG. 3J, the user 202 has arrived at his or her destination, and the interface device 150 requests feedback about the trip. The AV transportation services system 200 may store the user's information (e.g., in memory 144) to recommend future AV booking or riding. The AV transportation services system 200 also records the rides, for example, to more easily keep track of any items that are inadvertently left in a vehicle after a user departs.

In-Vehicle Augmented Reality Experiences

Figure 4A:
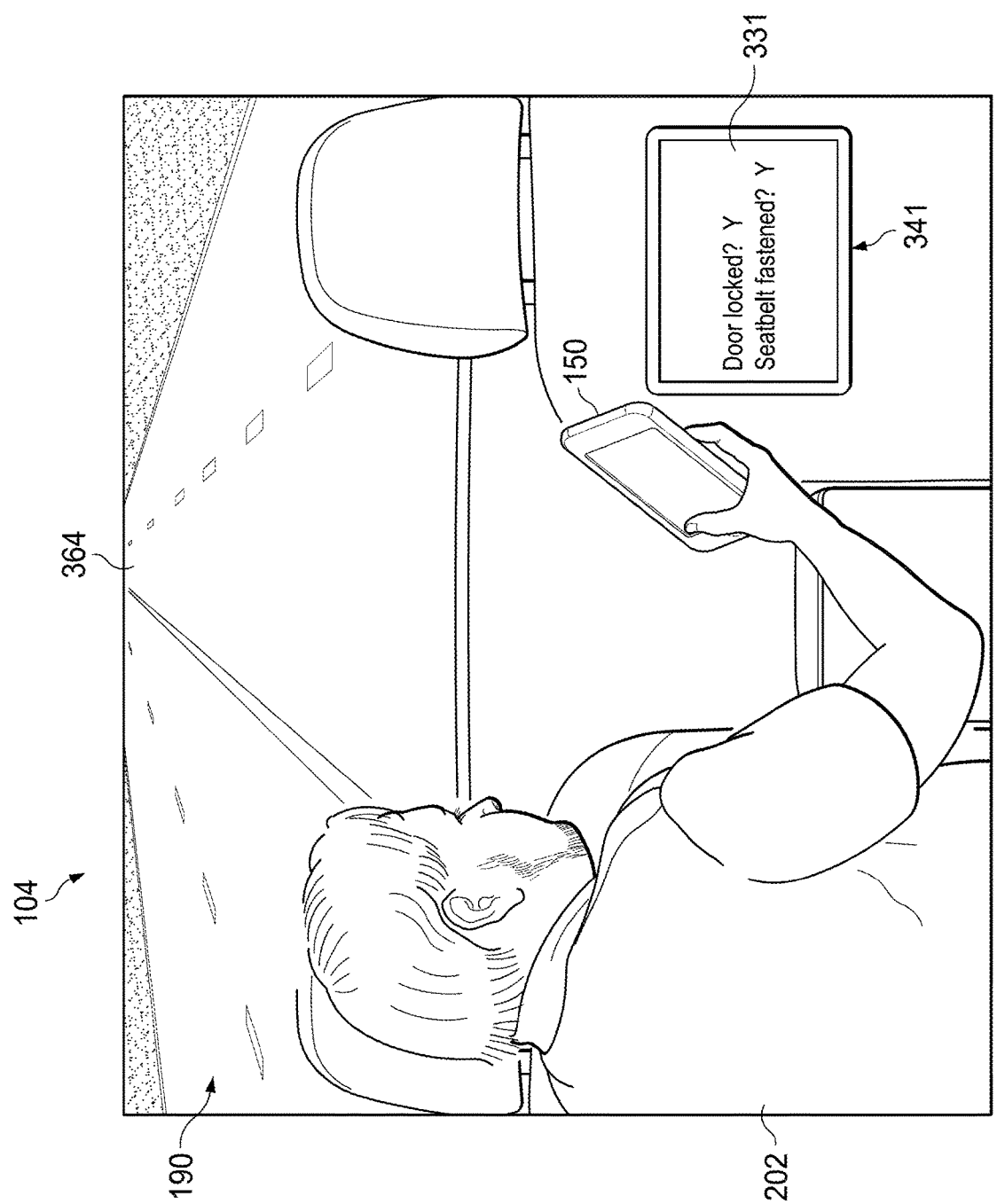

FIG. 4A shows a user 202 seated in the backseat of an AV interior 104. An in-vehicle display 331 can be located (e.g., mounted) on an in-vehicle display device 341 inside the AV 100 and within view of the user when seated inside (for example, near the back of the passenger seat facing a backseat rider as shown). The in-vehicle display 331 can be controlled using a variety of technologies, for example, gesture, voice, typing, controller, a 2D/3D user interface such as a 2D/3D augmented reality interface, or combinations of them, and can be displayed, for example, on a tablet, or projected onto a window or windshield 364 of the AV 100. If no display in projected onto the windshield 364, then the normal real world of the environment 190 of the AV 100 is shown through the windshield 364, as in the figure.

Information about the trip in progress can be shown on the interface device 150 or the in-vehicle display 331, or both, including the results of a safety check (e.g., if seat belts are fastened, if a child listed for the trip is secured in the child seat, if the doors are locked). In some instances, the user 202 can use the camera of their smart phone for a visual check on safety checks, e.g., the user can take a picture of a child sitting in a legally-required safety seat and upload the image to the AV transportation services system 200. In some instances, various sensors 121 located within the vehicle or cameras 122 within the vehicle can record the safety check (e.g., seatbelt sensors or in-vehicle camera that automatically takes and uploads a picture of a child securely fastened in a legally required safety seat).

Figure 4B:
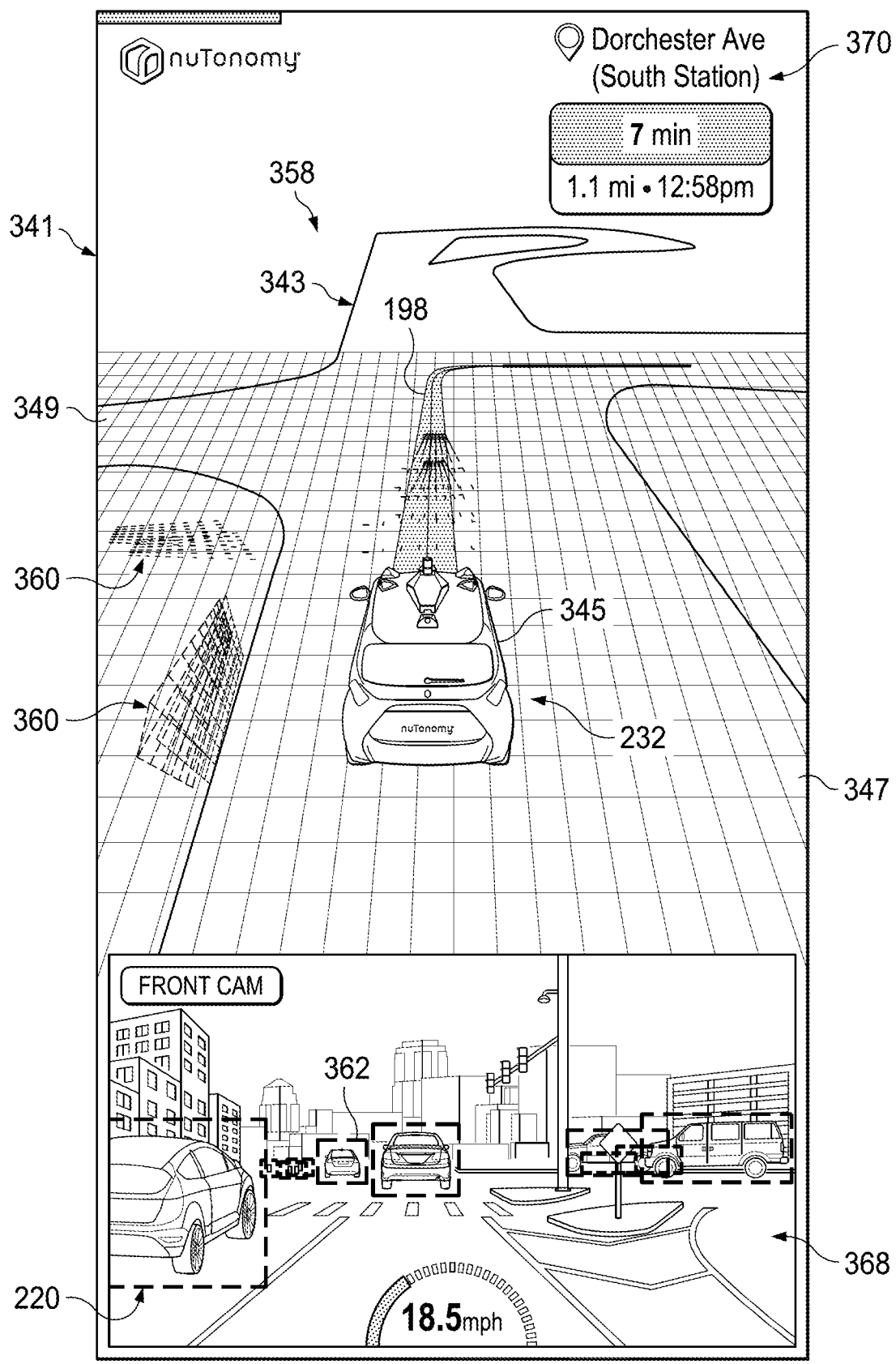
Figure 4C:
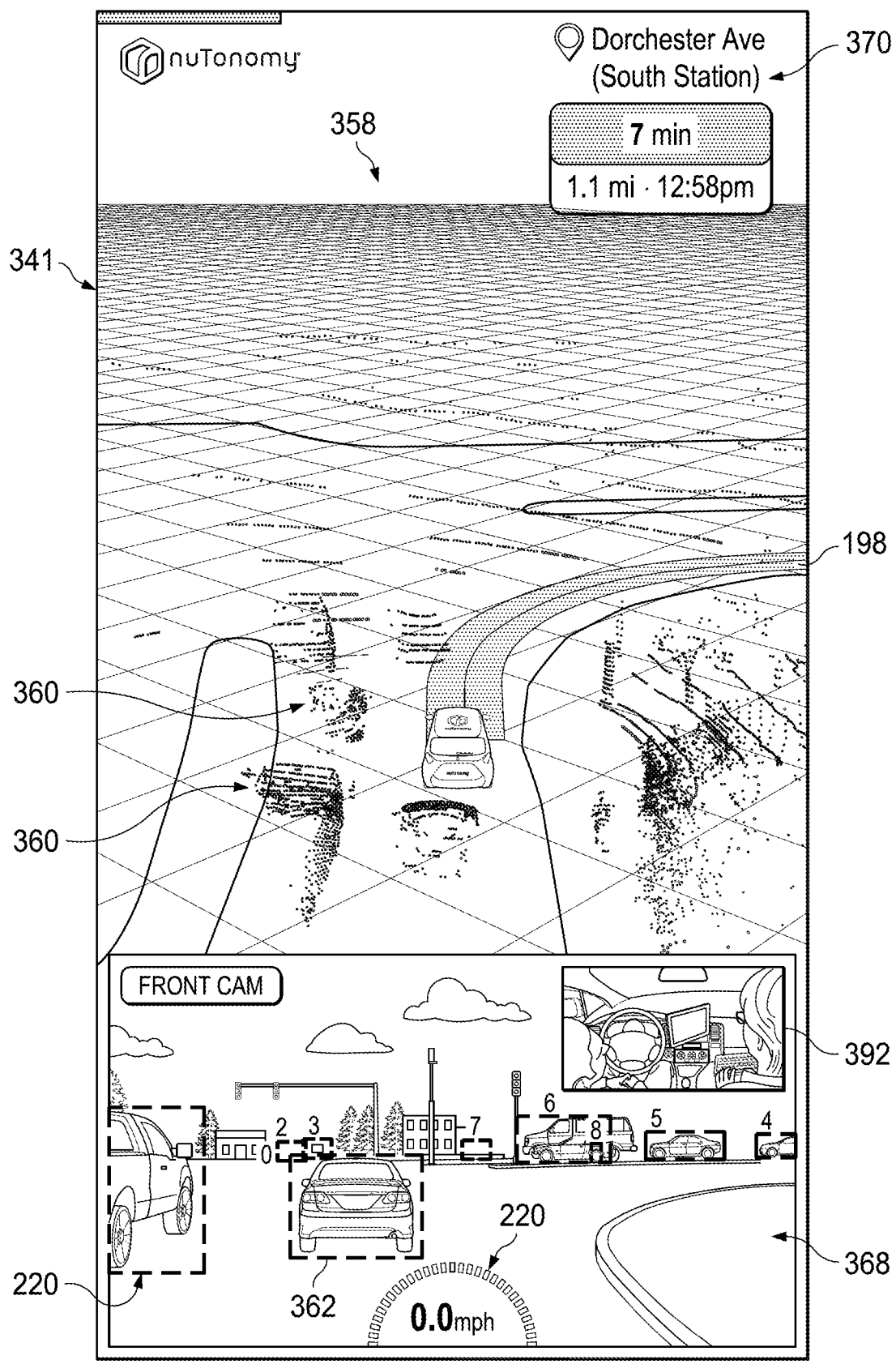

Referring to FIGS. 4B and 4C, the in-vehicle display device 341 (and/or the interface device 150) of FIG. 4A can display a three-dimensional perspective view of the vicinity 343 of the vehicle 345 in the direction of travel, including the road 347 currently being traveled, intersecting roads 349, a perspective view of the vehicle at its current position 232 in the context of direction of travel, objects 360 in the driving environment, and an approaching portion of the trajectory 198 toward the destination 199. This view can be a schematic view 358 or a picture display 368 or both. The objects 360 depicted in the view can be objects that have been detected in real time by the sensors 121 that are part of the AV system 120, including cameras 122.

FIGS. 4B and 4C show two examples of the in-vehicle display 341; the in-vehicle display 341 is continually updated in real time to show information about objects identified in the current sensor data as the AV 100 moves and as objects (such as pedestrians or other vehicles) around the AV 100 move.

This depiction in both the schematic view 358 and the picture display 368 provides comfort to users who may be unsure about riding in a vehicle without human operation. The depiction also can be informative and instructive about the operation of the vehicle. The cameras 122 detect 360 degrees around the vehicle and therefore the views can present information within a 360° range. Also depicted is trip information 370, including the current position, the destination, the time and distance remaining on a trip, and the current time, among other things.

In the schematic view 358, the objects 360 are illustrated using dots, dashes, or other abstract representations of information received by lidar or radar sensors. As the vehicle progresses along the trajectory, these arrays of dots, dashes, or other abstract representations change continuously to reflect the changing data received from the lidar or radar sensors.

The picture display 368 of the in-vehicle display 341 includes a real-time video camera presentation 369 of the real-world scene in the direction of travel of the vehicle. The picture display 368 includes enhancement features 220. In the example figures, the enhancement features 220 are red boxes or tags 362 identifying features or objects 360 in the vehicle surroundings. The enhancement features 220 are overlaid on real data, e.g., tags 362 are overlaid on visual data from one of the cameras 122 mounted to the AV 100. The in-vehicle display 341 thus shows augmented reality, that is, a camera view supplemented by enhancement features identifying one or more objects shown in the camera view. In some instances, the appearance of the enhancement features 220 can change depending on the types of objects identified by the AV system 120. For example, the tags 362 can have a color, or shape, or outline, or other identifying marker that differentiates different classes of objects such as pedestrians, vehicles, or traffic control features such as cones or traffic lights.

A key function of the tags 362 is to demonstrate to the viewer which objects in the environment, in particular moving objects, have been identified by the AV system as the vehicle proceeds. Demonstrating this identification of objects including moving objects helps to comfort riders by implying that the sensors of the AV system are capable of identifying objects that may be hazards for the vehicle.

In addition to this depiction of objects detected by sensors 121 providing comfort to passengers riding in the vehicle, the enhancement features 220 can be used by a vehicle operator (either in the vehicle, or remotely), and by system operators such as safety engineers. A system operator viewing the in-vehicle display 341 can analyze and assess the efficacy of the AV system's ability to detect and identify objects detected by the sensors 121. A system operator can also view an in-vehicle view of a camera inside the AV 100.

In general, operating an autonomous system includes planning its motions. A trajectory may be associated with multiple motion actions (e.g., accelerate, maintain a speed, decelerate, change orientation, stop, follow traffic signals, and avoid hitting objects) that will be executed by an autonomous system in a driving environment to achieve the trajectory. Some motion actions may be performed in parallel (e.g., changing an orientation and deceleration), and some motion actions may be performed in series (e.g., acceleration and then deceleration). For instance, operating an autonomous system 120 along the trajectory 198 may include the following: accelerate at start, slow down and make a right turn at a given location, maintain a slow speed, make a left turn at a second location when the traffic signal allows the left turn, accelerate, decelerate at, and stop at a goal position. Implementations of the motion planner may include a trajectory identifier. The trajectory identifier may analyze a map for an autonomous system to navigate from a start position and a goal position. The map can show non-drivable regions, and other vehicles on the road. To identify possible trajectories, the trajectory identifier may begin by sampling the map. The samples that are in the non-drivable regions or blocked by an object (e.g., a vehicle) are then removed. Based on the remaining sampling points, the trajectory may identify multiple candidate trajectories. Safety engineers developing such a motion planning algorithm could be assisted by AR features (enhancement features 220) included in the map. Such a safety engineer may be present in the AV 100 and accessing a system diagram of the vehicle or may be remote from the AV 100.

Among other things, a risk monitoring process may identify risks by monitoring an environment near the AV, an operation of the AV system, or the interior of the AV, or combinations of them. For instance, analyzing signals from sensors 121 (e.g., a vision sensor, a lidar or a radar, or combinations of them) can produce information about other objects (e.g., vehicles, infrastructure, and pedestrians) in the environment; examples of such information include: locations, speeds, orientations, boundaries, sizes, dimensions, traffic lights, manufacturers, plate numbers, owners, drivers, and vehicle operations. The information may be analyzed to e.g., predict a potential collision or detect an existing collision. Analyzing a map from a database or images from a vision sensor, or both, can further determine foreground and background. For example, a map used by the AV system 120 may encode information about an elevation profile of the road surface. This information can be used to classify a given point as belonging to the road surface by analyzing depth information, acquired from a vision sensor (e.g., a stereo camera) and applying segmentation to identify a background region, or a foreground object, or both. Safety engineers developing a risk management algorithm could be assisted by AR features (enhancement features 220) included in the map. For example, the system may include enhancement features 220 on a real world view of the road surface image that distinguish points as belonging to the background or foreground. A safety engineer viewing such an image can easily classify the points and reclassify the points if they have been misidentified, improving the accuracy of the detection algorithm.

Figure 4D:
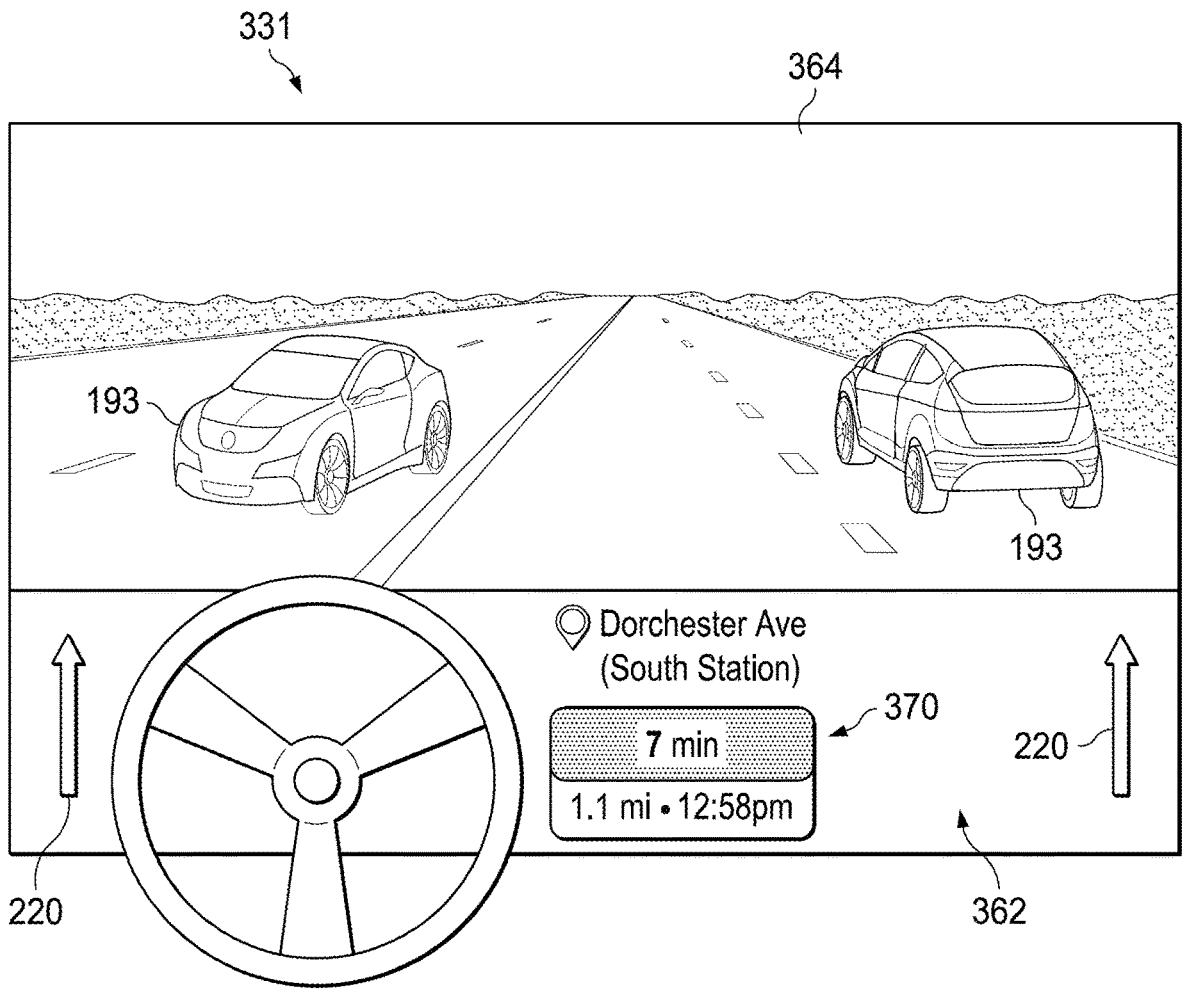
Figure 4E:
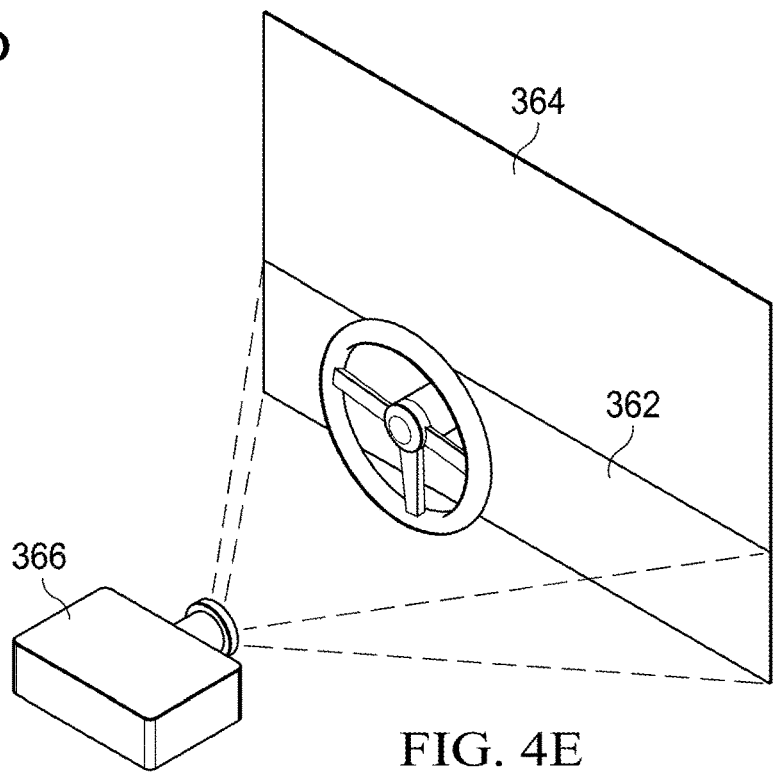
Figure 4F:
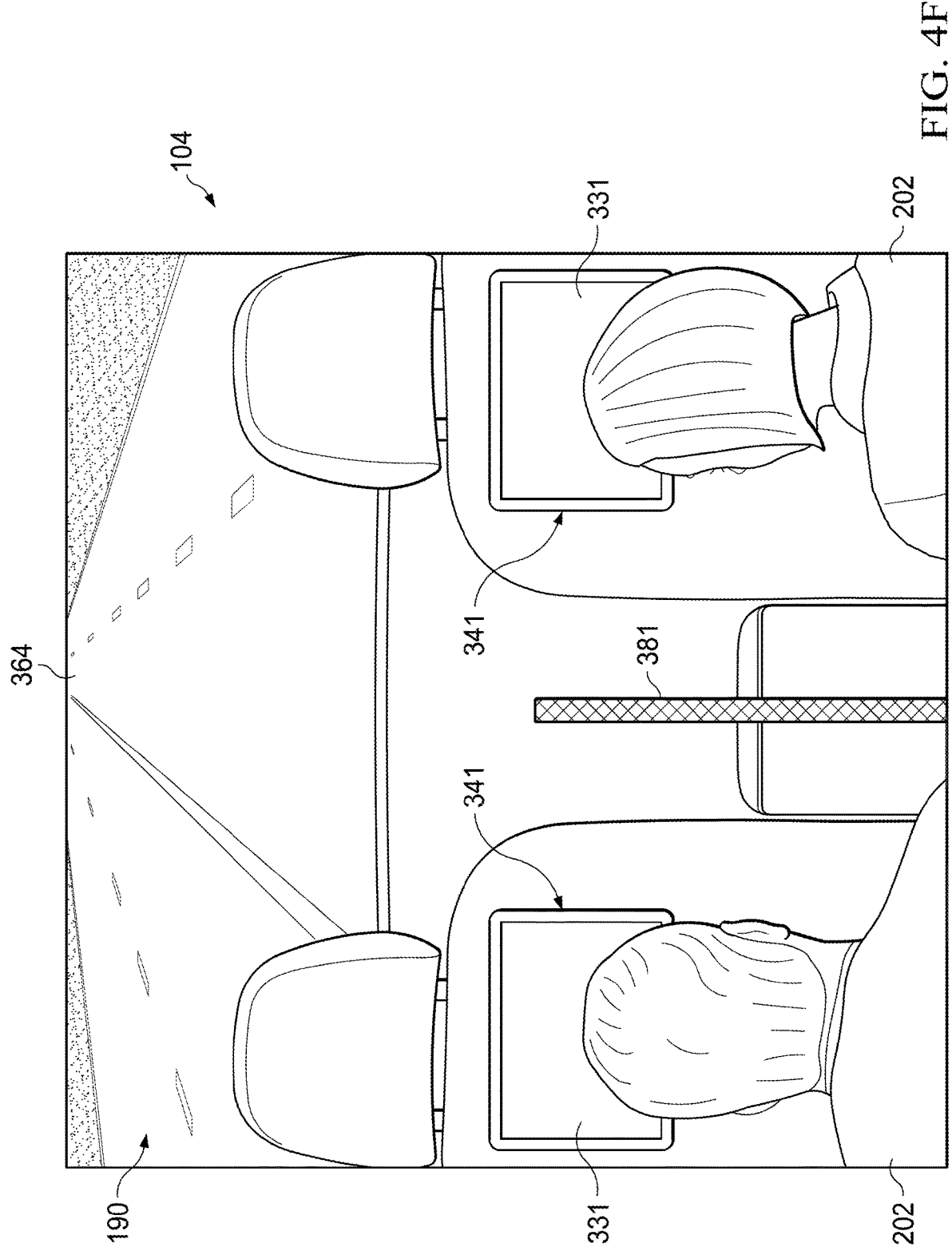

Referring to FIGS. 4D and 4E, an AR screen 362 can be part of the in-vehicle display that is visible on a windshield 364 of the AV 100. In this instance, the windshield 364 is largely a conventionally see-through surface, and actual vehicles 193 are visible through the most of the windshield 364. In addition, the AR screen 262 occupies a bottom portion of the windshield 364, for example a projector 366 within the AV 100 projects information and enhancement features 220 into the AR screen 262. In some instances, the AR screen 262 is at least partly see through. Information can be displayed on the AR screen 262, such as trip information 370. The AR screen 262 can also display enhancement features 220; in this instance the enhancement features 220 are markers or tags indicating that a vehicle 193 (or other object) has been detected by the sensors 121 of the AV system 120 at a position near or above the position of the marker, and identified or classified as a vehicle. The enhancement feature 220 can be different for each type or class of object identified. For example, the marker or tag may have a different color or different shape to identify a pedestrian, another vehicle, a traffic cone, etc. In some instances, instead of a separate physical screen (or in addition to it), the bottom portion of the windshield 364 can be coated with a coating that allows information to be displayed on it; for example, the coating may allow the information for the AR screen 262 to be projected onto the glass of the windshield 364.

The user interface information presented on the in-vehicle display screen 331 or on the AR screen 262 can be shared with other devices. For example, the information can be shared to a screen on a smartphone, for example, a smartphone of a waiting family member, or can be shared to a screen being observed by a teleoperator or a fleet manager as discussed below.

In some instances, the in-vehicle display 341 can display a virtual scene such as a nature scene. Instead of the enhancement features 220 shown in FIG. 4D that indicate the position and operation of the AV system 100, such a virtual scene can allow a passenger within the AV 100 to experience a virtual environment (as his or her attention is not necessary for operation of the vehicle). The virtual scene can be displayed on the windows and/or windshield, so the rider may immerse themselves in a virtual environment (e.g., virtual reality inside an AV 100). The vehicle could thus appear to be passing through a different (a calming, or exotic) scene instead of the actual environment being traversed by the vehicle (e.g., a cityscape).

In some instances, a virtual shield 381 is positioned between seats or between in-vehicle displays 331 in the AV interior 104. The virtual shield 381 ensures that the screen of one in-vehicle display 331 (which can be an AR headset 380) cannot be seen by another user 202. If there are multiple users (e.g., carpoolers) in a vehicle, a first passenger wearing AR glasses may have his or her own immersion environment that is separate and private from the AR environment of a second fellow passenger. The virtual shield 381 may be advantageous in instances where multiple users 202 are sharing the same AV 100. In some instances the virtual shield 381 can be a privacy screen such as screens that do not allow a viewer to view a screen display greater than a pre-determined angle relative to the screen. In other instances the virtual shield 381 can be a field damper.

The various screen displays discussed above should be considered by way of example, other information, details, and inputs are also possible and within the scope of this disclosure.

Figure 5A:
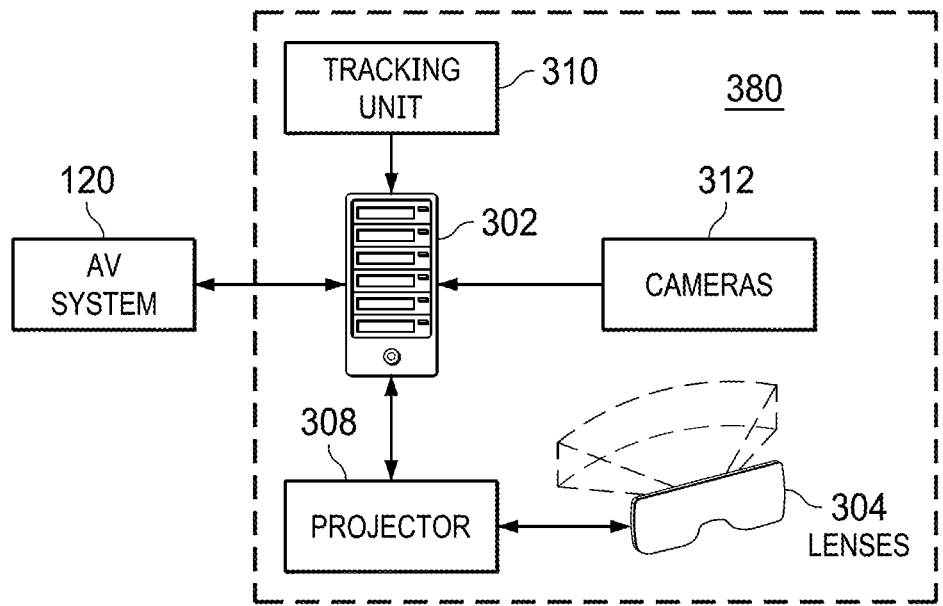

FIG. 5A shows a diagram of an augmented reality (AR) headset 380 that can operate as part of the AV transportation services system 200. An AR headset can include a processor 302. The processor receives data from and returns data to the AV system 120, and receives data from a tracking unit 310. The data processed by the processor 302 is displayed on the screen present in the AR 380 headset, which is a pair of lenses 304 is used for visualization of the rendered image. The tracking unit tracks the movement of the user's head via multiple sensors that determine information such as the coordinates of the user's orientation, and can include a 3 axis gyroscope, a 3 axis accelerometer, a 3 axis magnetometer (or compass), and sensors that detect ambient light sensing and proximity of objects to the sensor. These data can include angular position (yaw/pitch/roll), velocity and acceleration, as well as linear (x/y/z) position, velocity, and acceleration data. These data are fed to the processor 302 which generates the real time rendered images. The rendered images are then displayed on the screen or lenses 304, thereby creating stereo visual sensations. The AR headset 380 can also include one or more cameras 120 capable of video recording, and wireless transmitters and receivers (e.g., Wi-Fi and/or Bluetooth). Such an AR headset 380 detects the real world environment of the user 202, including the orientation of the user and a rendering of what the user is seeing in his or her environment.

Figure 5C:
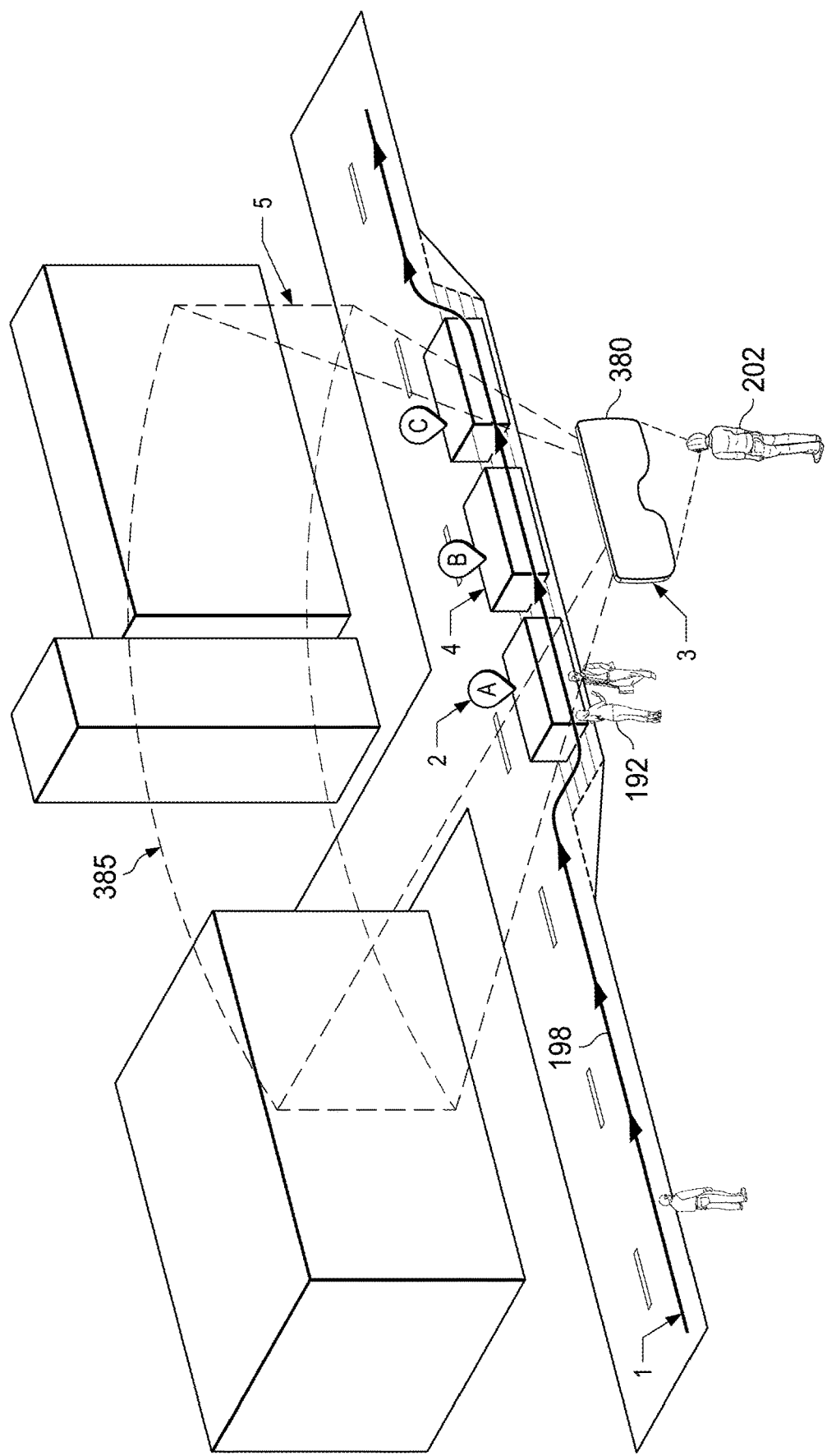
Figure 5D:
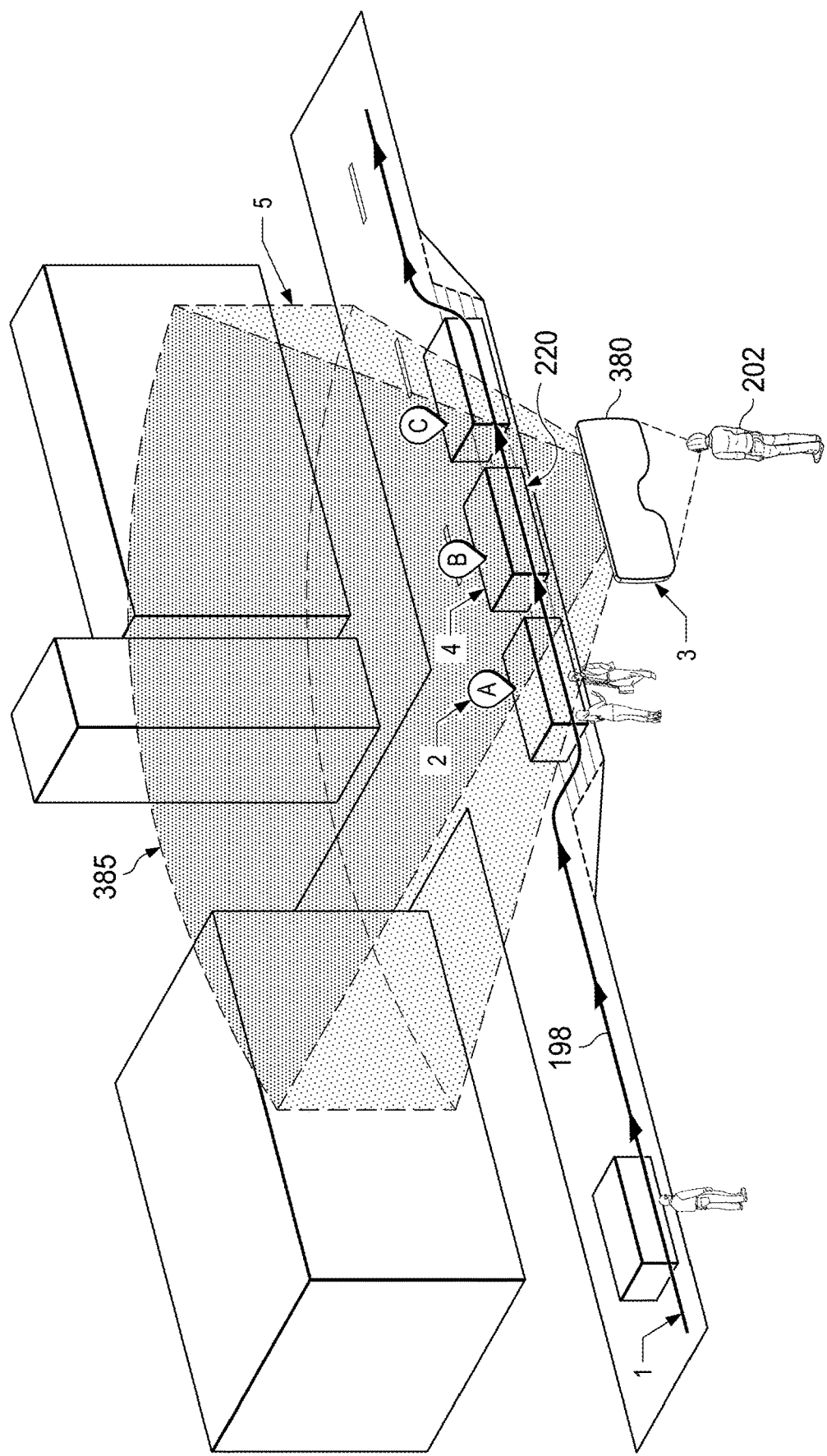
Figure 5E:
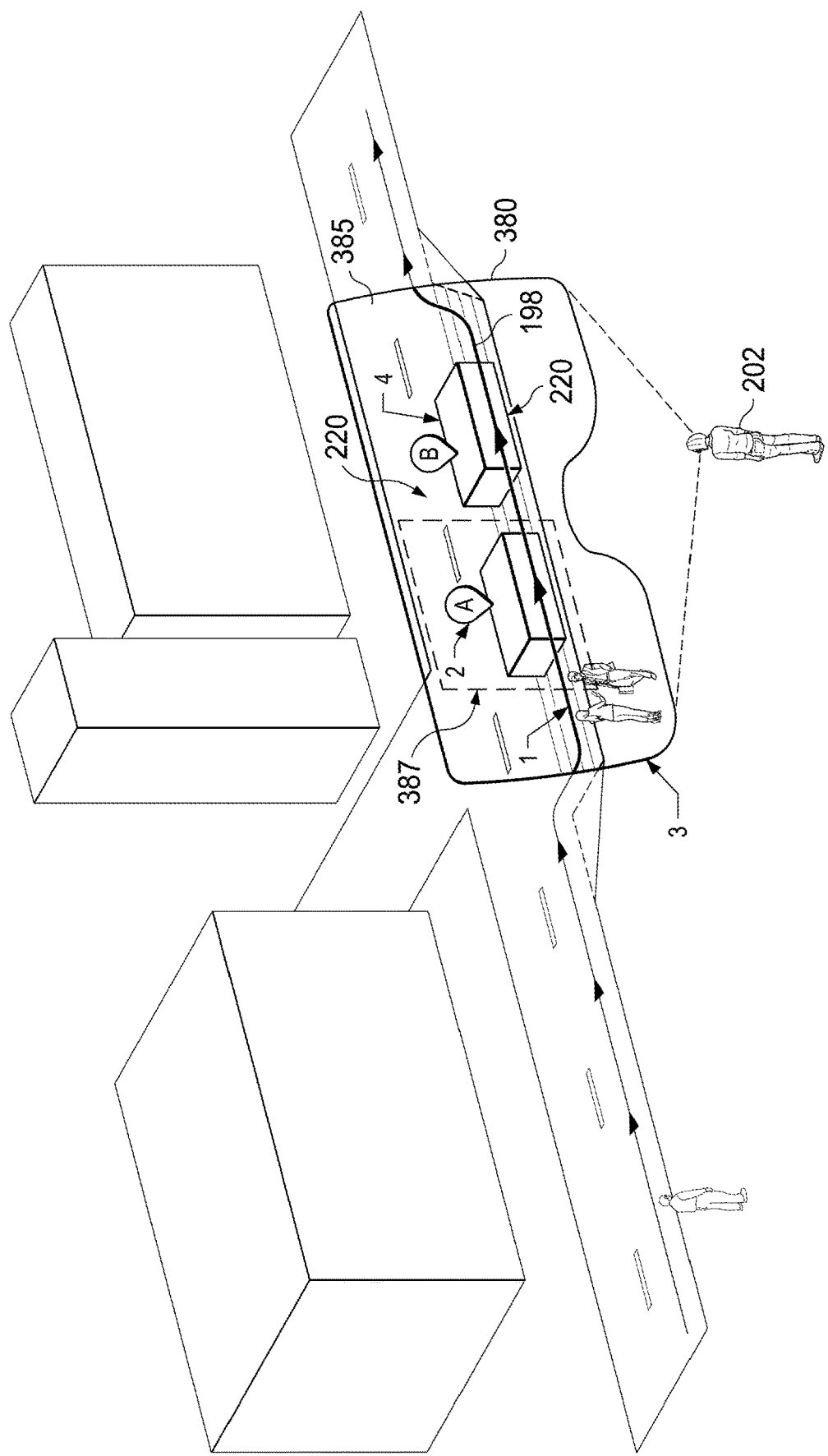

FIG. 5B shows a top perspective view and FIG. 5C-E shows 3D schematic views of a user 202 wearing an augmented reality (AR) headset 380 that can operate as part of the AV transportation services system 200. The AR headset 380 can be goggles or glasses worn by the user 202), which shows enhancement features 220. Such an AR headset 380 can include an optical head-mounted display designed in the shape of a pair of eyeglasses.

In the examples shown in the figures, the enhancement features 220 are an overlay of two or more potential pickup locations including potential pickup locations 214, 216 and the proposed route or trajectory 198 of a hailed AV 100 that is enroute to the user 202. The AR headset 380 adds these features into the display (e.g., causes them to appear on the glasses of the AR headset 380) to make them appear as if those objects are in the real world environment. Thus, the user 202 looking through the AR headset 380 sees real world features such as buildings or pedestrians 192 that are within a field of view 385 of the headset 380 and also sees enhancement features 220 that are displayed on the AR headset 380 as if the enhancement features 220 are part of the real world environment.

The AR headset 380 can adapt the enhancement features 220 displayed, and the view of the enhanced features displayed, as the user changes his or her field of view 385 to include different sightlines and objects. The gyroscope, accelerometer, and magnetometer within the AR headset 380 detect the new orientation and the new field of view that is visible to the camera within the AR headset 380. Different objects (e.g., different pedestrians 192) are visible through the headset 380. At the same time, different enhancement features 220 are also visible through the headset 380. A processor associated with the AR headset 380 generates the different views of the enhanced features and embeds the AR features into the real world view in real time. In this example, the enhancement feature 220 seen through the headset 380 is the portion of the trajectory 198 that is to be traversed by the hailed AV 100. As the user 202 changes his or her orientation, for example to the left, different portions of the real world environment and enhancement features 220 become visible. The system is able detect the actual view of the user's current environment and project accurate enhancement features 20 onto the glasses for simultaneous viewing appropriate to a given field of view 385 at a given time.

As seen in FIG. 5E, the enhancement features 220 are made available to the headset 380. The camera, gyroscope, accelerometer, and magnetometer of the AR headset 380 detect the real world view and orientation of the headset 380. The user 202 looks through the glasses and sees the real world field of view, and also appears to see the portion of the trajectory 198 that is present within the current field of view 385. This enhancement feature 220 is displayed on the glasses of the AR headset 380 itself so as to overlay the real world features within the field of view 385 of the user 202 at the given moment.

In some examples, the enhancement features 220 allow a user to distinguish the assigned vehicle from any other vehicles that might be in the same area. In FIG. 5E, two enhancement features 220 are visible, the trajectory 198 and AV marker 387. The AV marker 387 is a special feature displayed on the AR headset 380 (e.g., color, flashing lights, spotlight, arrow, etc.) that identifies a specific AV 100. The AV marker 387 is of particular use if there are multiple AVs 100 present in a region; as the user 202 looks through the AR headset 380 the AV marker 387 identifies the specific vehicle that has been assigned to that user 202.

Teleoperation

On some occasions, such as when an AV is driving on a road and experiences an event—such as a system fault, extreme weather conditions, or temporary detour—it may be useful to have a remotely located person provide assistance in the operation of the AV. A teleoperation system, which may be remote or local or a combination of remote and local to the AV or AV system, can enable a teleoperator to interact with the AV system (e.g., providing commands, visualizing a driving condition, and investigating functionality of a hardware component or software process) through a communication channel. The interactions may assist the AV system to adequately respond to various events. The use of teleoperator system with an AV system is described in the application "Intervention in Operation of a Vehicle Having Autonomous Driving Capabilities", U.S. patent application Ser. No. 15/624,780, filed on Jun. 16, 2017, the contents of which are incorporated in their entirety.

Figure 6A:
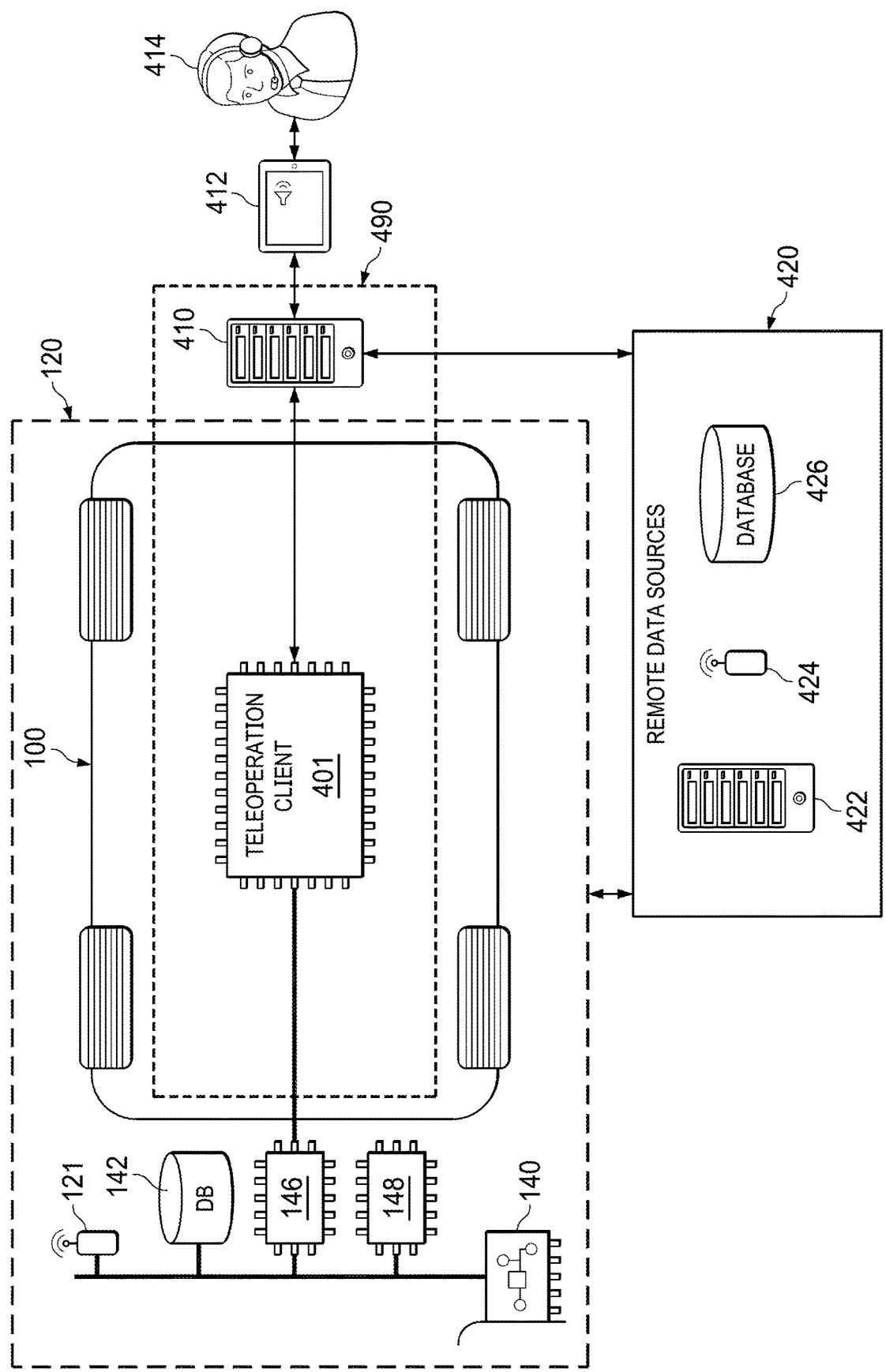

FIG. 6A illustrates an architecture of a teleoperation system. A teleoperation system 490 may include the several elements including a teleoperation client 401 (e.g., hardware, software, firmware, or a combination of two or more of them), typically installed on an AV 100 of an AV system 120. The teleoperation client 401 may interact with components (e.g., sensors 121, communication devices 140, a database 412, user interface devices, memory 140, or functional devices, or combinations of them) of the AV system 120, for example, sending and receiving information and commands. The teleoperation client 401 can communicate over a communication interface 140 (that may be at least partly wireless) with a teleoperation server 120.

The teleoperation system 490 has a teleoperation server 410, which may be located in the AV 100 or in a remote location, for example, at least 0.1, 1, 4, 3, 4, 5, 10, 40, 30, 40, 50, 100, 100, 300, 100, 500, 600, 700, 900, or 1000 meters away from the AV 100. The teleoperation server 410 communicates with the teleoperation client 401 using the communication interface 140. In some implementations, the teleoperation server 410 can communicate simultaneously with multiple teleoperation clients; for example, the teleoperation server 410 communicates with another teleoperation client 451 of another AV that is part of another AV system. The client 401 may communicate with one or more data sources 420 (e.g., a central server 422, a remote sensor 424, and a remote database 426 or combinations of them) to collect data (e.g., road networks, maps, weather, and traffics) for implementing autonomous driving capabilities. The teleoperation server 410 may also communicate with the remote data sources 420 for teleoperations for the AV system 120.

When one or more components of the AV system 42 (FIG. 1) is in an abnormal or unexpected condition (e.g., malfunctions or generates an unusual output), a teleoperation event may be triggered. For instance, a brake malfunctions; a flat tire occurs; the field of view of a vision sensor is blocked; a frame rate of a vision sensor drops below a threshold; an AV system's movement does not match a current steering angle, a throttle level, a brake level, or a combination of them; a fault occurs in the software code; a signal strength is reduced; a noise level increases; an unknown object is perceived in the environment of the AV system; a motion planning process is unable to find a trajectory towards the goal due to a planning error; a data source (e.g., a database, a sensor, and a map data source) becomes inaccessible; or combinations of them. A teleoperation event may be triggered by an occurrence or a request. Examples include: a detour, a protest, a fire, an accident, a flood, a fallen tree or rock, a medical emergency, a police request, a request by an occupant in the AV (e.g., a passenger does not like driving behaviors of the AV system), a request by a user of the AV (e.g., a package sender using the AV system to ship packages wants to change a new trajectory or a destination), or initiation by a teleoperator, or combinations of them.

Figure 6B:
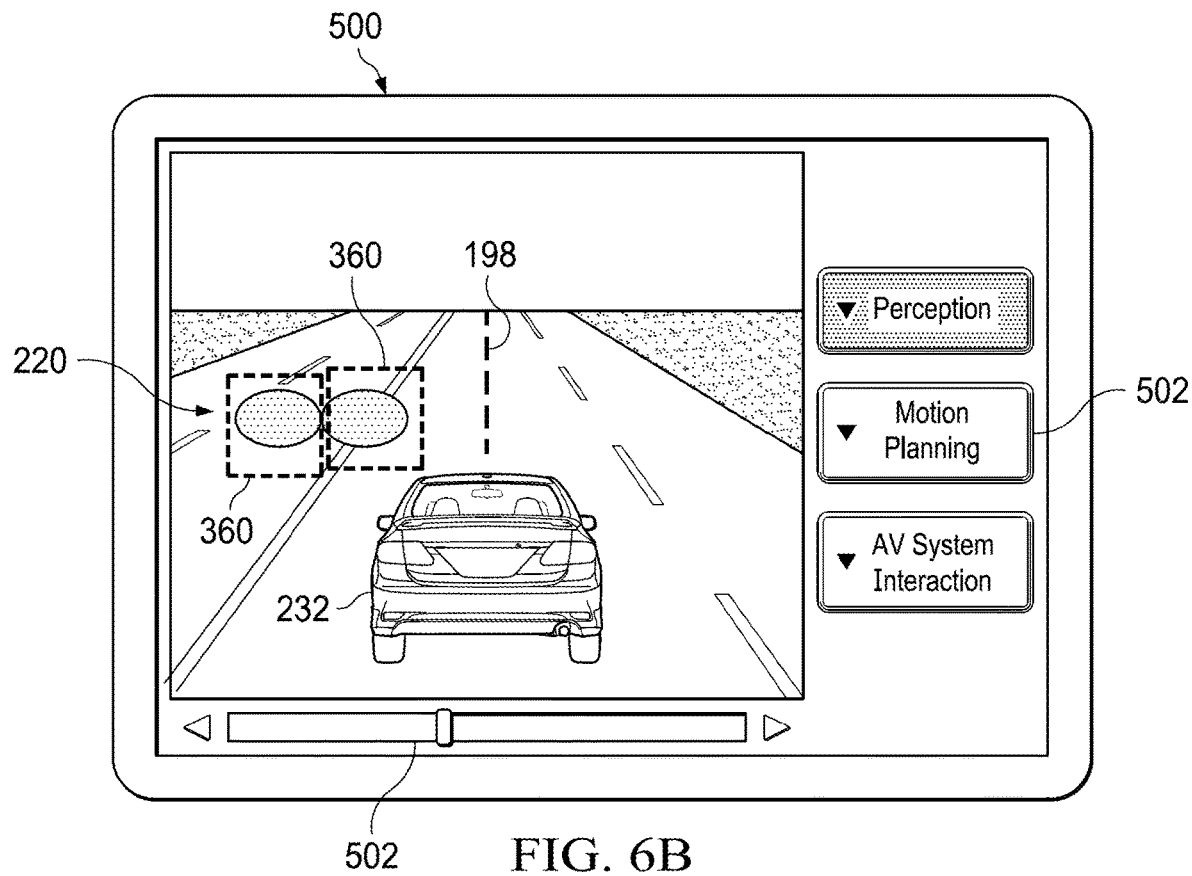

The teleoperation system 490 also has a user interface 412 presented by the teleoperation server 410 for a human teleoperator 414 to engage in teleoperations for the AV system 100. In some cases, the interface 412 may render to the teleoperator 414 what the AV system 100 has perceived or is perceiving in the real world. Referring to FIG. 6B, example teleoperation screens 500 may appear similar to the in-vehicle display 341 (which is shown on the user interface device 150 inside the AV 100) and can display a virtual map or a picture display (FIG. 6C) depicting the vehicle's current position 232, objects 360 in the driving environment, and a portion of the trajectory 198. This rendering can be a schematic map, and can be identical or similar to the in-vehicle display 341, with the addition of teleoperation features 502 that allow the human user 414 to interact with the teleoperation client 401.

Figure 6C:
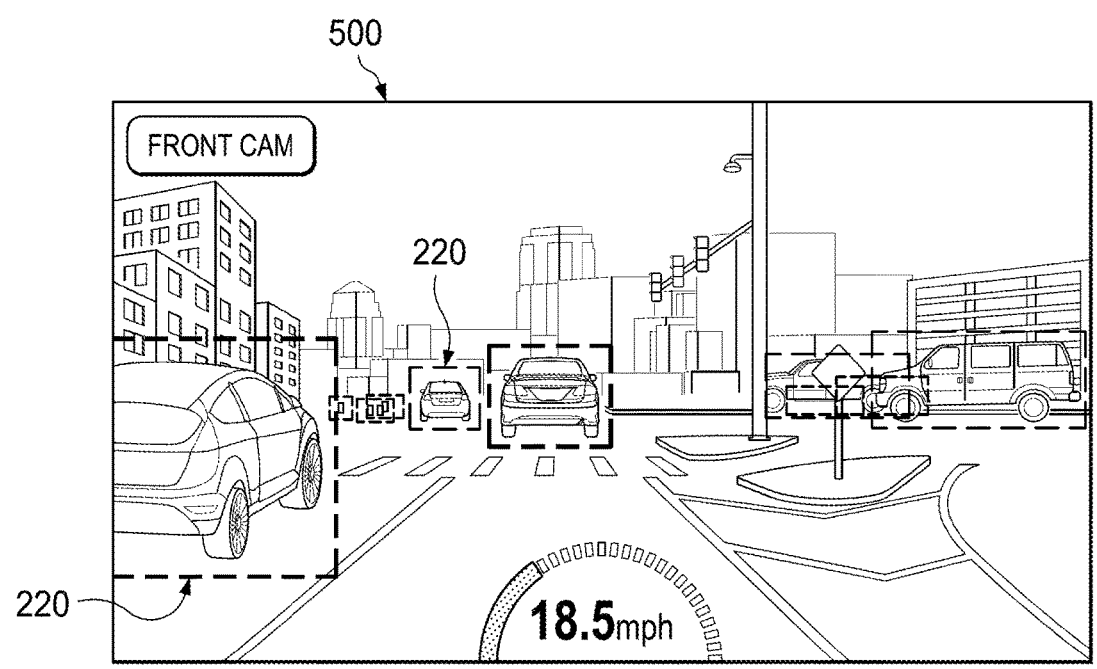

The rendering on the teleoperation screen 500 can include enhancement features 220, for example boxes 220 in FIGS. 6B and 6C that highlight identified objects 360 in the surroundings of the AV 100. The enhancement features 220 can aid a human user 414 to decide if or how to respond to a teleoperation event or teleoperation request. In some implementations, the teleoperation server 410 renders an environment of the AV system 120 through a user interface to the teleoperator, and the teleoperator can see the environment to select an optimal teleoperation. In some implementations, the user interface that renders the environment of the AV system 120 to the teleoperator can be a screen, or can be multiple screens. The multiple user interface screens can be connected and curved or bent so as to at least partially surround a teleoperator; in some instances the teleoperator can be completely surrounded by a rendering of the environment of the AV system 120, creating an immersive environment for a teleoperator. This enables the teleoperator to see everything that is occurring in a full 360 degree field around the vehicle, including vehicles and object behind and to the sides of the vehicle that are normally out of the field of view of a person looking forward. This teleoperator-surrounding rendering can simulate the experience of a passenger actually riding inside the AV vehicle 100. The rendering can include enhancement features 220, and teleoperation features 502. In some instances, the rendering can be connected to an AR headset 380 worn by a user inside the AV vehicle 100. The teleoperator's view can be updated with the passenger's view as the passenger turns his or head and thereby changes the view of the headset 380.

The teleoperation server 410 may recommend possible teleoperations through an interface to the teleoperator, and the teleoperator 414 can select one or more of the recommended teleoperations and cause the teleoperations to be sent to the AV system 120. In some examples, the teleoperator uses the interface to draw a recommended trajectory for the AV along which to continue its driving.

Technology Components

Figure 7:
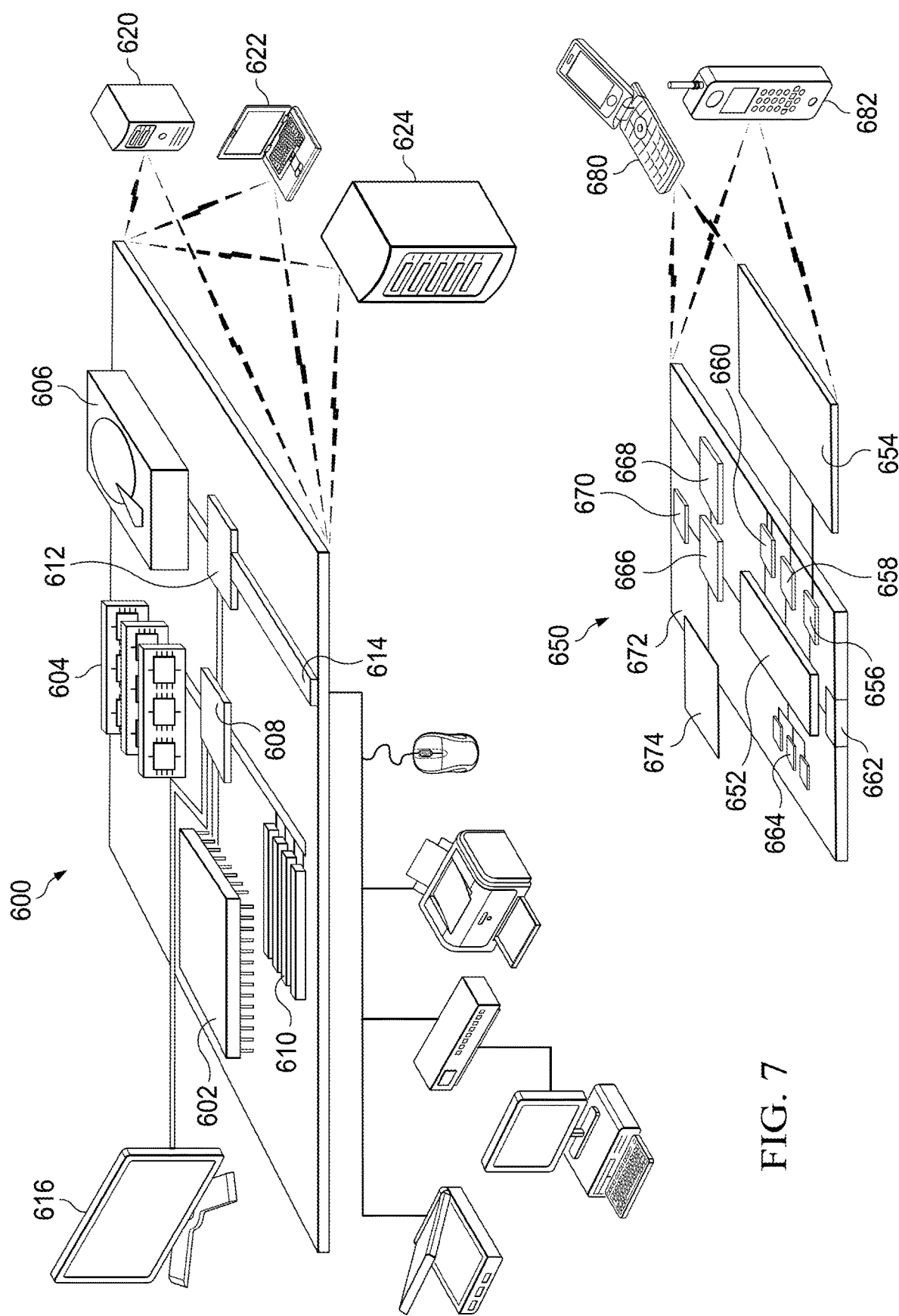

FIG. 7 shows an example computer device 600 and example mobile computer device 650, which can be used to implement the technologies that we have described. For example, a portion or all of the operations of the AV system 150 may be executed by the computer device 600 and/or the mobile computer device 650. Computing device 600 is intended to represent various forms of digital computers, including, e.g., laptops, desktops, workstations, personal digital assistants, servers, blade servers, mainframes, and other appropriate computers. Computing device 650 is intended to represent various forms of mobile devices, including, e.g., personal digital assistants, cellular telephones, smartphones, and other similar computing devices.

The components shown here, their connections and relationships, and their functions, are meant to be examples only, and are not meant to limit implementations of the techniques described and/or claimed in this document.

Computing device 600 includes processor 602, memory 604, storage device 606, high-speed interface 608 connecting to memory 604 and high-speed expansion ports 610, and low speed interface 612 connecting to low speed bus 614 and storage device 606. Each of components 602, 604, 606, 608, 610, and 612, are interconnected using various busses, and can be mounted on a common motherboard or in other manners as appropriate. Processor 602 can process instructions for execution within computing device 600, including instructions stored in memory 604 or on storage device 606, to display graphical data for a GUI on an external input/output device, including, e.g., display 616 coupled to high speed interface 608. In other implementations, multiple processors and/or multiple buses can be used, as appropriate, along with multiple memories and types of memory. Also, multiple computing devices 600 can be connected, with each device providing portions of the necessary operations (e.g., as a server bank, a group of blade servers, or a multi-processor system).

Memory 604 stores data within computing device 600. In one implementation, memory 604 is a volatile memory unit or units. In another implementation, memory 604 is a non-volatile memory unit or units. Memory 604 also can be another form of computer-readable medium, including, e.g., a magnetic or optical disk.

Storage device 606 is capable of providing mass storage for computing device 600. In one implementation, storage device 606 can be or contain a computer-readable medium, including, e.g., a floppy disk device, a hard disk device, an optical disk device, a tape device, a flash memory or other similar solid state memory device, or an array of devices, including devices in a storage area network or other configurations. A computer program product can be tangibly embodied in a data carrier. The computer program product also can contain instructions that, when executed, perform one or more methods, including, e.g., those described above. The data carrier is a computer- or machine-readable medium, including, e.g., memory 604, storage device 606, memory on processor 602, and the like.

High-speed controller 608 manages bandwidth-intensive operations for computing device 600, while low speed controller 612 manages lower bandwidth-intensive operations. Such allocation of functions is an example only. In one implementation, high-speed controller 608 is coupled to memory 604, display 616 (e.g., through a graphics processor or accelerator), and to high-speed expansion ports 610, which can accept various expansion cards (not shown). In the implementation, the low-speed controller 612 is coupled to storage device 606 and low-speed expansion port 614. The low-speed expansion port, which can include various communication ports (e.g., USB, Bluetooth®, Ethernet, wireless Ethernet), can be coupled to one or more input/output devices, including, e.g., a keyboard, a pointing device, a scanner, or a networking device including, e.g., a switch or router (e.g., through a network adapter).

Computing device 600 can be implemented in a number of different forms, as shown in the figure. For example, it can be implemented as standard server 620, or multiple times in a group of such servers. It also can be implemented as part of rack server system 624. In addition or as an alternative, it can be implemented in a personal computer (e.g., laptop computer 622). In some examples, components from computing device 600 can be combined with other components in a mobile device (not shown) (e.g., device 650). Each of such devices can contain one or more of computing device 600, 650, and an entire system can be made up of multiple computing devices 600, 650 communicating with each other.

Computing device 650 includes processor 652, memory 664, and an input/output device including, e.g., display 654, communication interface 666, and transceiver 668, among other components. Device 650 also can be provided with a storage device, including, e.g., a microdrive or other device, to provide additional storage. Components 650, 652, 664, 654, 666, and 668, may each be interconnected using various buses, and several of the components can be mounted on a common motherboard or in other manners as appropriate.

Processor 652 can execute instructions within computing device 650, including instructions stored in memory 664. The processor can be implemented as a chipset of chips that include separate and multiple analog and digital processors. The processor can provide, for example, for the coordination of the other components of device 650, including, e.g., control of user interfaces, applications run by device 650, and wireless communication by device 650.

Processor 652 can communicate with a user through control interface 658 and display interface 656 coupled to display 654. Display 654 can be, for example, a TFT LCD (Thin-Film-Transistor Liquid Crystal Display) or an OLED (Organic Light Emitting Diode) display, or other appropriate display technology. Display interface 656 can comprise appropriate circuitry for driving display 654 to present graphical and other data to a user. Control interface 658 can receive commands from a user and convert them for submission to processor 652. In addition, external interface 662 can communicate with processor 642, so as to enable near area communication of device 650 with other devices. External interface 662 can provide, for example, for wired communication in some implementations, or for wireless communication in other implementations. Multiple interfaces also can be used.

Memory 664 stores data within computing device 650. Memory 664 can be implemented as one or more of a computer-readable medium or media, a volatile memory unit or units, or a non-volatile memory unit or units. Expansion memory 674 also can be provided and connected to device 850 through expansion interface 672, which can include, for example, a SIMM (Single In Line Memory Module) card interface. Such expansion memory 674 can provide extra storage space for device 650, and/or may store applications or other data for device 650. Specifically, expansion memory 674 can also include instructions to carry out or supplement the processes described above and can include secure data. Thus, for example, expansion memory 674 can be provided as a security module for device 650 and can be programmed with instructions that permit secure use of device 650. In addition, secure applications can be provided through the SIMM cards, along with additional data, including, e.g., placing identifying data on the SIMM card in a non-hackable manner.

The memory can include, for example, flash memory and/or NVRAM memory, as discussed below. In one implementation, a computer program product is tangibly embodied in a data carrier. The computer program product contains instructions that, when executed, perform one or more methods, including, e.g., those described above. The data carrier is a computer- or machine-readable medium, including, e.g., memory 664, expansion memory 674, and/or memory on processor 652, which can be received, for example, over transceiver 668 or external interface 662.

Device 650 can communicate wirelessly through communication interface 666, which can include digital signal processing circuitry where necessary. Communication interface 666 can provide for communications under various modes or protocols, including, e.g., GSM voice calls, SMS, EMS, or MMS messaging, CDMA, TDMA, PDC, WCDMA, CDMA2000, or GPRS, among others. Such communication can occur, for example, through radio-frequency transceiver 668. In addition, short-range communication can occur, including, e.g., using a Bluetooth®, Wi-Fi, or other such transceiver (not shown). In addition, GPS (Global Positioning System) receiver module 670 can provide additional navigation- and location-related wireless data to device 650, which can be used as appropriate by applications running on device 650.

Device 650 also can communicate audibly using audio codec 660, which can receive spoken data from a user and convert it to usable digital data. Audio codec 660 can likewise generate audible sound for a user, including, e.g., through a speaker, e.g., in a handset of device 650. Such sound can include sound from voice telephone calls, recorded sound (e.g., voice messages, music files, and the like) and also sound generated by applications operating on device 650.

Computing device 650 can be implemented in a number of different forms, as shown in the figure. For example, it can be implemented as cellular telephone 680. It also can be implemented as part of smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system. This includes at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for presenting data to the user, and a keyboard and a pointing device (e.g., a mouse or a trackball) by which the user can provide input to the computer. Other kinds of devices can be used to provide for interaction with a user as well. For example, feedback provided to the user can be a form of sensory feedback (e.g., visual feedback, auditory feedback, or tactile feedback). Input from the user can be received in a form, including acoustic, speech, or tactile input.

The systems and techniques described here can be implemented in a computing system that includes a backend component (e.g., as a data server), or that includes a middleware component (e.g., an application server), or that includes a frontend component (e.g., a client computer having a user interface or a Web browser through which a user can interact with an implementation of the systems and techniques described here), or a combination of such backend, middleware, or frontend components. The components of the system can be interconnected by a form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engines described herein can be separated, combined or incorporated into a single or combined engine. The engines depicted in the figures are not intended to limit the systems described here to the software architectures shown in the figures.

A number of embodiments of the invention have been described. For example, although the descriptions in this document have described implementations in which the teleoperator is a person, teleoperator functions can be performed partially or fully automatically.

Other implementations are also within the scope of the following claims.

What is claimed is:

1. An apparatus comprising:
   at least one processor; and
   at least one non-transitory storage media storing instructions that, when executed by the at least one processor, cause the at least one processor to:
   receive through a user interface of a device, an input from a user with respect to a trip of the user in an autonomous vehicle, the input indicating a feature of the autonomous vehicle that is controlled, wherein the feature is a temperature, a seat position, a seat warmer, a window position, or a state of an entertainment system, and wherein the user interface comprises a real-time presentation of augmented reality elements superimposed on a real world scene via a map showing a current position and a current trajectory of the autonomous vehicle ending at a pickup location, and a vehicle specific prompt showing the feature; and
   control the feature of the autonomous vehicle using the vehicle specific prompt, wherein the vehicle specific prompt shows features of the autonomous vehicle as the autonomous vehicle approaches the pickup location.

2. The apparatus of claim 1, wherein the input from the user comprises a number of passengers for the trip.

3. The apparatus of claim 1, wherein the state of the entertainment system comprises at least one of a type of entertainment content.

4. The apparatus of claim 1, wherein the state of the entertainment system comprises an identifier of a broadcast station.

5. The apparatus of claim 1, wherein the input from the user comprises an identification of a source or type of content for the entertainment system.

6. The apparatus of claim 1, wherein the input from the user comprises an indication of a child to be present on the trip.

7. The apparatus of claim 1, wherein the input from the user comprises of information about packages for the trip.

8. The apparatus of claim 1, wherein the at least one processor and at least one non-transitory storage media are part of a central autonomous vehicle system.

9. The apparatus of claim 1, wherein the instructions executable by the at least one processor are to communicate an action to the autonomous vehicle, the action taken with respect to the autonomous vehicle to respond to the input from the user.

10. A mobile device comprising:
   at least one display;
   at least one processor; and
   an application or a browser to cause the at least one processor to present on the at least one display a user interface with at least one option to control a feature of an autonomous vehicle for a trip, wherein the feature is a temperature inside the autonomous vehicle, a seat position, a seat warmer, a window position, or a state of an entertainment system, the user interface comprising a real-time presentation of augmented reality elements superimposed on a real world scene via a map showing a current position and a current trajectory of the autonomous vehicle ending at a pickup location and a vehicle-specific prompt showing the feature, wherein the feature is controlled using the vehicle specific prompt, wherein the vehicle specific prompt shows features of the autonomous vehicle as the autonomous vehicle approaches the pickup location.

* * * * *